(12) United States Patent
Chattey

(10) Patent No.: US 6,234,714 B1
(45) Date of Patent: *May 22, 2001

(54) PIER AND WHARF STRUCTURES HAVING MEANS FOR DIRECTLY TRANSFERRING CARGO BETWEEN TWO VESSELS OR BETWEEN A VESSEL AND RAILCARS

(76) Inventor: Nigel Chattey, 22 Cedarlawn Rd., Irvington-on-Hudson, NY (US) 10533-1924

( * ) Notice: Subject to any disclaimer, the term of this patent is extended or adjusted under 35 U.S.C. 154(b) by 0 days.

This patent is subject to a terminal disclaimer.

(21) Appl. No.: 09/489,319

(22) Filed: Jan. 21, 2000

Related U.S. Application Data

(63) Continuation of application No. 09/149,525, filed on Sep. 8, 1998, now Pat. No. 6,017,167, which is a continuation-in-part of application No. 08/569,656, filed on Dec. 8, 1995, now Pat. No. 5,803,659.

(51) Int. Cl.$^7$ ............................. E02D 23/00; E02D 23/02
(52) U.S. Cl. .......................... 405/8; 405/204; 405/205; 114/256
(58) Field of Search ....................... 405/8, 14, 21, 405/26, 31, 204, 205; 114/256, 257

(56) References Cited

U.S. PATENT DOCUMENTS

| | | | |
|---|---|---|---|
| 231,957 | 9/1880 | Dyer | 405/33 X |
| 414,244 | 11/1889 | Patton | 405/8 |
| 559,116 | 4/1896 | Baldwin | 405/13 |
| 609,686 | 8/1898 | Lovejoy | 405/10 |
| 868,092 | 10/1907 | Hennebique | 405/205 |
| 924,362 | 6/1909 | Leow | 405/13 |
| 946,841 | 1/1910 | Gilman | 405/11 |
| 1,151,974 | 8/1915 | Straight | 256/19 |
| 1,310,461 | 7/1919 | Williams | 405/204 |
| 1,610,341 | 12/1926 | Wells | 405/21 |
| 1,949,680 | 3/1934 | Ebner | 405/274 |
| 2,474,786 | 6/1949 | Humphrey | 405/30 |

(List continued on next page.)

FOREIGN PATENT DOCUMENTS

| | | |
|---|---|---|
| 0873978 | 4/1953 | (DE) . |
| 0244930 | 11/1987 | (EP) . |
| 0511443 | 12/1920 | (FR) . |
| 0743246 | 3/1933 | (FR) . |
| 1012795 | 7/1952 | (FR) . |
| 2616464 | 12/1988 | (FR) . |
| 0000079 | 1/1867 | (GB) . |
| 9428253 | 12/1994 | (WO) . |

OTHER PUBLICATIONS

Agema, "Havendammen aan zee", Cement, vol. 24, No. 12, Dec. 1972, Amsterdam, pp. 511–515.

Mouw, "Geotextielen bij het Costerschelde–project: Ontwikkeling en toepassing", Pt/Civiele Techniek, vol. 41, No. 1, Mar. 1986, Den Haag, pp. 5–12.

World Cargo News, "Poseidon for Portsmouth", Apr. 1999, pp. 1–4.

*Primary Examiner*—David Bagnell
*Assistant Examiner*—Tara L. Mayo
(74) *Attorney, Agent, or Firm*—Adams & Wilks

(57) ABSTRACT

A marine terminal has a cargo crane for directly transferring cargo between two marine vessels or between a marine vessel and a land-side vehicle. The marine terminal may comprise a wharf having a docking side along which marine vessels dock, and a cargo crane movable lengthwise along the wharf for directly transferring cargo from a vessel docked alongside the wharf to a land-side vehicle, such as railcars or trucks. The marine terminal may comprise a pier having opposed docking sides, and a cargo crane movable lengthwise along the pier for directly transferring cargo from a vessel docked along one docking side of the pier to a vessel docked along the other docking side of the pier.

22 Claims, 14 Drawing Sheets

U.S. PATENT DOCUMENTS

| | | | |
|---|---|---|---|
| 2,705,403 | 4/1955 | Ebert | 405/13 |
| 2,938,353 | 5/1960 | Vorenkamp | 405/207 |
| 2,939,290 | 6/1960 | Crake | 405/205 |
| 3,118,282 | 1/1964 | Jarlan | 405/31 |
| 3,498,065 | 3/1970 | Templeton | 405/204 |
| 3,704,796 * | 12/1972 | Dedons et al. | 414/138.6 |
| 3,710,579 | 1/1973 | Killmer et al. | 405/11 |
| 3,846,988 | 11/1974 | Lamy | 405/31 |
| 3,891,079 * | 6/1975 | Roper | 198/518 |
| 4,023,687 * | 5/1977 | Salloum | 414/276 |
| 4,118,941 | 10/1978 | Bruce et al. | 405/204 |
| 4,175,888 | 11/1979 | Ijima | 405/31 |
| 4,279,536 | 7/1981 | Jarlan | 405/31 |
| 4,326,822 | 4/1982 | Oshima et al. | 405/217 |
| 4,366,029 * | 12/1982 | Bixby et al. | 202/262 |
| 4,436,447 | 3/1984 | Crowe | 405/32 X |
| 4,479,450 | 10/1984 | Lundberg | 405/4 X |
| 4,504,172 | 3/1985 | Clinton et al. | 405/217 |
| 4,512,684 | 4/1985 | Hale et al. | 405/217 |
| 4,523,879 | 6/1985 | Finucane et al. | 405/217 |
| 4,555,201 | 11/1985 | Paoluccio | 405/21 X |
| 4,583,882 | 4/1986 | Szabo | 405/217 |
| 4,648,752 | 3/1987 | Guy et al. | 405/277 X |
| 4,655,637 | 4/1987 | Vignocchi | 405/32 X |
| 4,693,631 | 9/1987 | McKay | 405/26 |
| 4,784,520 | 11/1988 | Stevens | 405/21 |
| 4,858,775 * | 8/1989 | Crouch | 212/312 |
| 4,963,058 | 10/1990 | Broughton et al. | 405/207 |
| 5,061,122 | 10/1991 | Chattey | 405/204 |
| 5,076,450 * | 12/1991 | Shimizu | 212/324 |
| 5,292,207 | 3/1994 | Scott | 405/207 |
| 5,951,226 * | 9/1999 | Fantuzzi | 414/141.3 |

\* cited by examiner

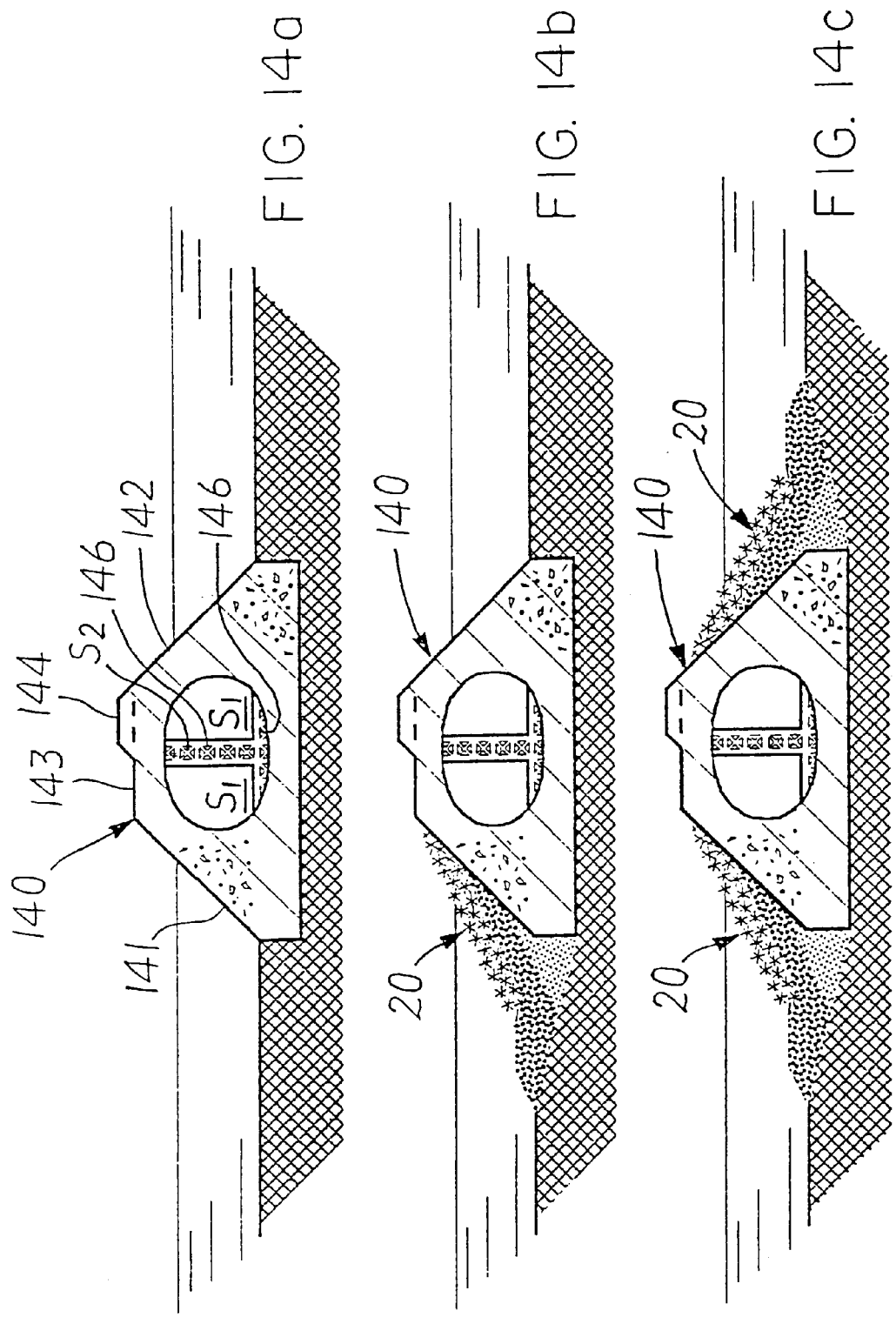

PIER AND WHARF STRUCTURES HAVING MEANS FOR DIRECTLY TRANSFERRING CARGO BETWEEN TWO VESSELS OR BETWEEN A VESSEL AND RAILCARS

RELATED APPLICATION

This application is a continuation of Ser. No. 09/149,525 filed Sep. 8, 1998, now U.S. Pat. No. 6,017,167, which is a continuation-in-part of application Ser. No. 08/569,656 filed Dec. 8, 1995, now U.S. Pat. No. 5,803,659.

BACKGROUND OF THE INVENTION

The present invention relates generally to modular caissons for use in constructing, expanding and modernizing ports and harbors, and more particularly to modular caissons which are constructed, in whole or in part, onshore and then floated to a preselected site, trimmed and ballasted down, and combined with other caissons to form marine structures and integrated marine structures/marine terminals.

There is a growing need to construct new ports and harbors and to expand or modernize existing ports and harbors. For example, in emerging market countries, there is the need for construction of new modern port and harbor facilities. For military and naval use, there is also a need for prefabricated, "instant" ports for the rapid deployment of forces, equipment and cargo at locations where port facilities are inadequate or non-existent. Existing ports and harbors must be periodically dredged to maintain them operational, and there is a heightened awareness of the environmental dangers posed by contaminated dredge material. This, in turn, has severely restricted the dredging of ports and harbors and has prevented the expansion and modernization of port and harbor facilities. There are now worldwide concerns, as well as international laws, prohibiting the dumping of contaminated dredge materials in the open ocean.

An example of the environmental and economic significance of contaminated dredge material recently occurred in New York Harbor. Having just completed construction of the Howland Hook Container Terminal, it was found that the material from dredging down the dock was so heavily contaminated with heavy metals, PCB's, dioxins, etc., that the only solution to disposing of this material (with open ocean dumping no longer allowed under the London Dumping Convention) was to ship it by train to a dump in Utah, a distance of over 2000 miles away at a cost exceeding $100/cubic yard—over 20 times the previously available cost when ocean dumping was available.

World trade patterns are changing rapidly in the post cold-war, post industrial age. Certain of these changing patterns will dominate for the foreseeable future:

(1) Trans-Pacific trade will far exceed, and continue to grow more rapidly, than trans-Atlantic trade.

(2) North/South trades in the western Pacific and western Atlantic oceans will become dominant trade routes in their own right.

(3) As a result of (1) and (2), there will be relatively less need to transit the Suez and Panama Canals, especially the Panama Canal with its relatively shallow 40 foot draft constraint.

These changing world trade patterns will result, from a marine standpoint, in the need to:

(1) Expand and/or modernize many older ports in industrialized nations if they are to remain competitive. This includes the United States where ports such as New York are increasingly outmoded by modern standards.

(2) Construct new ports in emerging market countries such as China, Indonesia, India, Brazil, Argentina and the countries of the former Soviet Union including Estonia, Ukraine, Georgia and Russia itself. Many of these potential port sites lie in remote areas away from industrial centers.

Ports and harbors have traditionally been constructed as stand-alone, one-of-a-kind, projects. First breakwaters, piers, wharves etc. are constructed and subsequently marine cargo terminals are erected on these marine structures, etc. No standardized methods have been developed to alter this relatively high cost, one-of-a-kind, method of construction.

Modernization of older port cities (whose depths were geared to the 40 feet and 45 feet draft constraints of the pre-World War II Panama and Suez Canals) requires them to now seek deeper water sites if they are to remain competitive. This is not as easy as it may seem. For example, the Port of New York is no longer able to receive the largest fully loaded container ships (or tankers) now in standard use, despite having spent $250 million in an attempt to deepen the Kill Van Kull channel leading to its largest container port and almost all of its oil terminals. This massive expenditure in dredging funds was mostly wasted as the Kull still remains too shallow by today's standards.

The problem is compounded by the port being originally sited on a shallow estuary and further compounded by a relatively shallow offshore continental shelf. For the Port of New York to find a deep-water site for a port may well involve moving offshore to a man-made island, much as the-Port of Rotterdam did when it built the "island" of Maasvlacht in the North Sea.

In certain cases, even in emerging countries, the problems of modernizing an existing major port are compounded by the original port having been located on relatively shallow water. For example, Tanjung Priok, the port of Jakarta on the island of Java, is one such case. Any modernization of this port will have to be undertaken out in the Java Sea because of the shallow shelf lying off the north coast of the island of Java.

With respect to the construction of new ports in emerging market countries, the problem is not so much the shortage of land with potential for deep-water port sites, but rather their remote location. For example, the two planned ports on the Kra Isthmus between Malaysia and Thailand are a case in point. Such sites are far from centers where port construction equipment, supplies and the necessary amount of skilled labor are available, and port construction has traditionally been a labor intensive undertaking. Before the port of Cam Ranh Bay was built in Vietnam it was in a similarly remote region.

In order to solve such major and growing problems, and in order to be cost-effective, it is necessary to develop an industrialized method for constructing, expanding or modernizing ports and harbors. Any such method, however, has to encompass all of the following:

(1) That it be modular in nature, with the modular components being pre-fabricated in existing shipyards and/or shipyard type facilities onshore.

(2) That the modular components be floatable, and have a naval architecture and marine engineering configuration that enables them to be towed (and/or pushed) by sea-going tugs, without other assistance, to installation sites, both near and far even under Beaufort Scale 4–5 conditions.

(3) That the single modular components are designed to be constructed either as monolithic structures (for use where draft constraints do not present a problem); or as sections that can be assembled one with another (for use at locations where draft constraints do present a problem).

(4) That the modular components be ballastable down and up and also precisely trimmable through the use of internal trim and ballast tanks and internal pumps, motors, piping and computer controls—thus obviating any need to use floating dry-dock type facilities in their launching or for their deployment to, or at, installation sites.

(5) That the modular components be designed and constructed so as to be capable of combining, within single integrated modules at installation sites, all of the following functions: Wave and weather protection; marine structure requirements; and intermodal (and/or intramodal) cargo handling, storage and transfer facilities for all types of cargos.

(6) That the modular components be able to contain, in an environmentally secure manner, contaminated materials including contaminated dredge material, either for long-term "entombment" and/or for subsequent decontamination.

SUMMARY OF THE INVENTION

One object of the present invention is to provide modular caissons which can be used in constructing, expanding and modernizing of ports and harbors and which overcome the aforementioned problems associated with the prior art methods.

Another object of the present invention is to provide modular caissons which can be constructed under cost-controlled conditions in shipyards, floated and towed out to a desired site, precisely trimmed, ballasted down and assembled in different combinations to constitute a wide array of marine structures such as breakwaters, breakwater piers, bulkhead wharves, wharves and piers.

A further object of the present invention is to provide trimmable, ballastable, modular caissons which can be precisely trimmed, ballasted down and assembled in different combinations to constitute a wide array of marine structures such as breakwaters, breakwater piers, bulkhead wharves, wharves and piers.

A further object of the present invention is to provide trimmable, ballastable, modular caissons which can be precisely trimmed and ballasted down and combined with other caissons to form integrated marine structures/marine cargo terminals.

Another object of the present invention is to provide a set of modular caissons of different but compatible constructions which can be precisely trimmed and ballasted down and, when necessary for realignment, etc., and which also can be precisely trimmable and ballastable up.

A further object of the present invention is to provide a wharf capable of directly transferring cargo, such as standardized container cargo, from one marine vessel to another marine vessel.

Another object of the present invention is to provide a pier capable of directly transferring cargo, such as standardized container cargo, between a marine vessel and land-side vehicles such as railcars and trucks.

These as well as other objects, features and advantages of the invention are achieved by providing a plurality of floatable modular caissons which are constructed onshore, either in whole or in part, towed to a desired site for port and harbor construction, expansion or modernization, precisely trimmed and ballasted down, and assembled in different combinations to form marine structures and/or integrated marine structures/marine cargo terminals to construct breakwaters, breakwater piers, bulkhead wharves, wharves and piers.

The breakwaters and/or breakwater piers are arranged to form a protected port or harbor and are designed to withstand maximum force waves and winds at the harbor site. As an integral part of the breakwater piers, modular caissons are assembled to form marine cargo terminals, such as liquid bulk terminals and liquefied natural gas/liquefied petroleum gas (LNG/LPG) terminals.

On the leeward side of the breakwaters and/or breakwater piers, other modular caissons are assembled to form a wide variety of marine structures (such as bulkhead wharves, wharves and piers) and/or integrated marine structures/marine cargo terminals (such as dry bulk and liquid bulk terminals, container terminals, general cargo terminals, roll-on/roll-off terminals and the like).

The various marine structures and integrated marine structures/marine cargo terminals may be disassembled and the caissons ballasted up and towed away for use at another port and harbor site. The rapid deployment and assembly potential of the marine structures/marine terminals as well as their potential for rapid disassembly and removal to another site makes the modular caissons ideally suited for many naval and military applications.

The foregoing as well as other objects, features and advantages of the invention will become apparent to those of ordinary skill in the art upon a reading of the following detailed description of the invention when read in conjunction with the accompanying drawings.

BRIEF DESCRIPTION OF THE DRAWINGS

FIGS. 14a–14c are end views of a breakwater caisson, shown partly cut-away along section line 14—14 in FIG. 1.

For clarity of illustration, FIGS. 1–14 are not all drawn to the same scale.

DETAILED DESCRIPTION OF THE INVENTION

Figure 1:
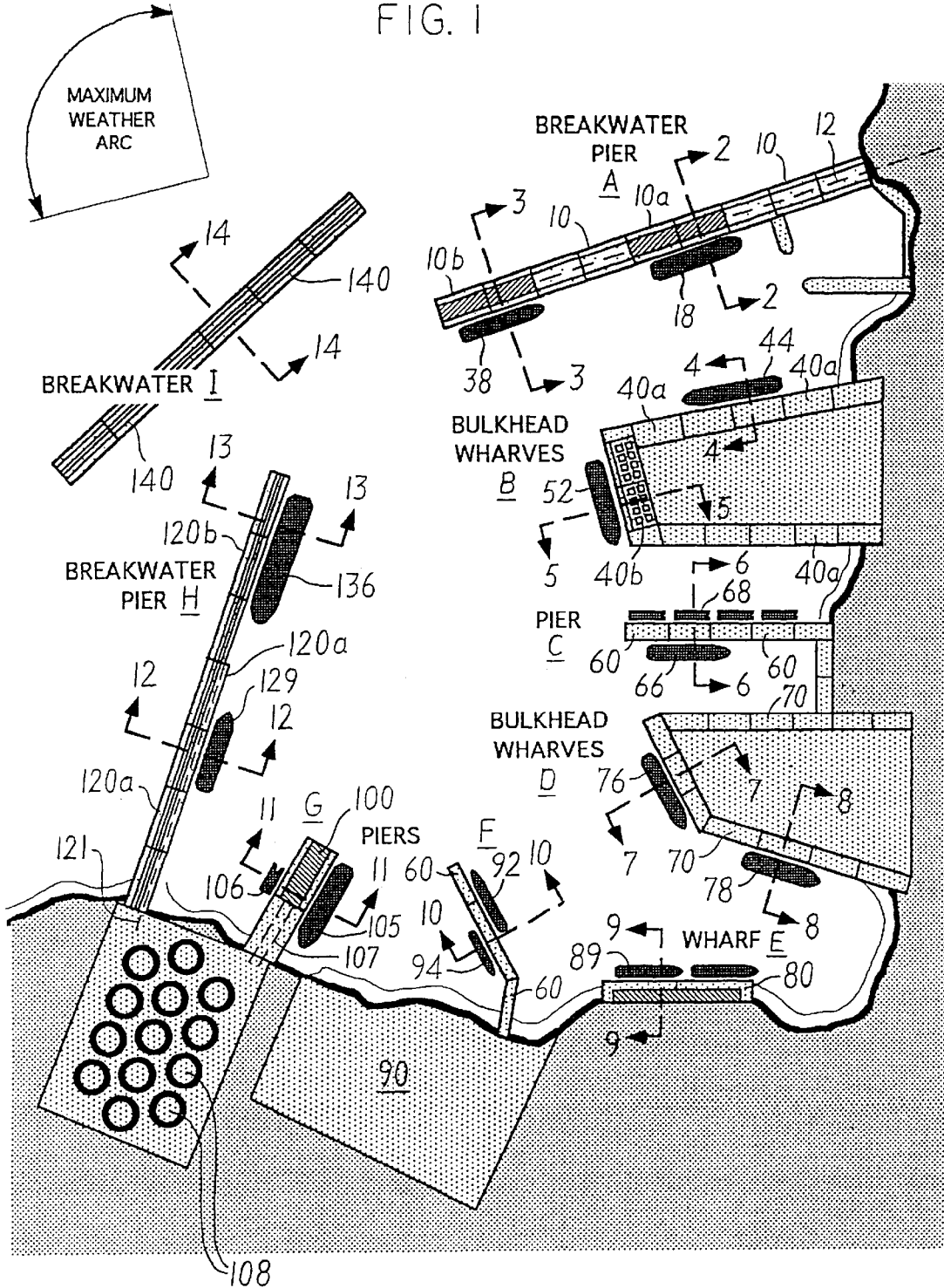
FIG. 1 is an illustrative layout of one example of port and harbor facilities constructed of caissons according to the principles of the present invention.

The present invention relates generally to the use of modular caissons in the construction, expansion and modernization of ports and harbors. For illustrative purposes only, the present invention will be described with reference to one typical port and harbor layout, it being understood that the caisson constructions and layout shown in the drawings are for illustrative purposes only and merely represent several of the multitude of different caisson constructions and layouts that can be realized according to the present invention. Thus the present invention is in no way limited or restricted to the particular caisson constructions and layouts illustrated in the drawings.

As used throughout the specification and claims, the term "caisson" or "modular caisson" refers to and means a stand-alone structure which may be manufactured either as a single, monolithic, floatable box-like structure, or as a plurality of caisson sections. The term "caisson section" refers to and means a box-like structure which is combinable on site with one or more other box-like structures to form a caisson, wherein each box-like structure is manufactured either as a single, monolithic, floatable structure, or as a combination of caisson sectional components. The term "caisson sectional component" refers to and means a floatable structural component, such as a side wall, end wall, or bottom, which is combinable on site with other caisson sectional components to form a caisson section. All of the floatable parts, whether caissons, caisson sections or caisson sectional components, are provided with computer-controlled trim and ballast tanks to precisely trim the floatable parts for towing by tugs to the harbor construction site and to precisely trim and ballast the floatable parts during assembly of the caisson sections and sectional components to form caissons and/or during positioning, alignment and assembly of the caissons to form breakwaters, piers, wharves and other marine structures and/or to form integrated marine structures/marine cargo terminals.

The caissons have internal spaces (dedicated by location within the caisson) to fulfill one or more of three specific functions:

(1) Large, enclosed storage spaces or compartments $S_1$, located within the caisson, expressly for large volume storage of bulk materials and/or other cargos including containerized cargo and/or for housing large volume processing equipment and/or large volume power generation equipment, etc.;

(2) Small spaces or compartments $S_2$ located along caisson sides and/or bottoms, preferably between double walls in the caissons, expressly for housing the trim and ballast tanks, equipment, etc. for the ballasting and precise trimming of the caissons; and (3) Small auxiliary spaces or compartments $S_3$, located anywhere within the caisson not occupied by structural components or by spaces $S_1$ and $S_2$, expressly for housing auxiliary equipment or functions that support and assist in operating the caissons as integrated marine structures/marine terminals, and/or processing facilities and/or power generation plants, etc.

For ease of description, the compartments or spaces $S_1$, $S_2$ and $S_3$ will be referred to hereinafter as simply "spaces".

The caissons are designed with a mass distribution effective to maintain the stability and structural integrity of the caissons even when the internal voids or spaces thereof are empty or substantially empty. In addition, it should be noted that unlike cofferdams, in which the sand or gravel within the interiors of the cofferdam members is required in order to impart structural integrity to the members, the structural integrity of the caissons is maintained even when the internal voids or spaces $S_1$, $S_2$ and $S_3$ thereof are empty or substantially empty.

The modular caissons can be combined in various configurations to form marine structures of various types, such as breakwaters, piers and wharves readily adaptable to the site conditions and requirements of the ports and harbors at which they are deployed.

Whatever the combination of caissons eventually installed, those marine structure caissons and those integrated marine structure/marine terminal caissons can be installed, when necessary, on rubble mound beds and can be "armored" on their weather sides, when necessary, with traditional wave defense rubble mounds. Such wave defense rubble mounds usually contain a core of sand and/or gravel, one or two layers of underlayer armor of quarry rock, and one or two layers of outer layer armor, such as dolos, tetrapods, etc. If CORE-LOC armor as developed by the U.S. Army Corps of Engineers is used because of its greater stability, this outer layer armor needs only to be one layer thick, resulting in significant cost savings.

Maximum economic advantage is gained where the caissons can be manufactured as floatable monolithic modules in shipyards or shipyard-type facilities onshore. However, in cases where draft or other constraints prevent such monolithic manufacture, the modular caissons can be manufactured in one or more floatable caisson sections, which are assembled on rubble mound beds and/or one atop another on site.

In the case of sectional construction, a floatable base section is towed to the site and ballasted down into place. If draft and other conditions permit, a second floatable section is towed to the site and ballasted down onto the base section. Alternatively, the base section may serve as a construction platform for on-site construction of the upper portion of the caisson. For maximum economic advantage, the floatable base sections should be manufactured at a shipyard or shipyard-type facility onshore up to the maximum draft available at that facility and in a navigation channel leading from that facility to the port or harbor site.

In the case of caissons manufactured in whole or in part from caisson sectional components, to accomplish this in the most cost-effective manner, manufacturing should, to the maximum extent possible, result in caisson sectional components that can be floated and towed by tugs to installation assembly sites and, only when this is not feasible, should sectional components be designed to be transported to the installation sites by heavy lift vessels and/or crane ships. The objective in both instances is to maximize construction under cost-controlled conditions in shipyards or shipyard-type facilities onshore, and minimize construction offshore.

The caissons can be constructed using traditional materials, preferably concrete (made from cement, sand and gravel or crushed stone aggregates) and steel for structural reinforcement. The caissons can also be constructed using newer materials, including polymer concretes and composites, especially those that also provide added corrosion resistance to the caissons in a salt water environment. The use of these new materials, which are lighter and stronger than traditional materials, can contribute greatly to reducing the weight (and draft) of the caissons, thereby increasing their utility, especially at locations where draft constraints exist.

The floatable caissons, caisson sections and caisson sectional components are designed to be constructed with single walls, double walls, or a combination of both. While, under certain conditions, single-wall construction is desirable, double-wall construction is preferable for several reasons. All other things being equal, double-wall construction allows for stronger caisson construction, with greater economy in the use and cost of materials, and greater control in trimming and ballasting the caissons. In the preferred design, the caissons, caisson sections and caisson sectional components have a double-wall design with internal trim and ballast tanks therebetween.

The caissons preferably have double-wall construction longitudinally in the side walls and bottom and preferably have single-wall construction in the end walls and transverse bulkhead walls. The reasons for this distinction are that:

(1) The double longitudinal walls enable the optimal placement, and provide for the necessary structure, to house the trim and ballast tanks and equipment while also providing no greater longitudinal structural strength to the caisson than is absolutely required, thus minimizing construction costs.

(2) The single end walls and transverse walls enable maximization of the volume of, and thus maximization of the revenue earning capacity of, the caisson while also providing no greater transverse structural strength to the caisson than is absolutely required, thus again minimizing construction costs.

The various floatable parts (caissons, caisson sections and caisson sectional components) are provided with trim and ballast tanks, which are preferably vertically spaced in columns and horizontally spaced in rows. The tanks in the several top rows constitute trim tanks and the tanks in the remaining rows constitute ballast and/or storage tanks. Suitable piping, pumps, motors, valves and controls are housed within each of the floatable parts and, under control of a computer, microcontroller or microprocessor, selectively and individually pump fluids (typically seawater) into and out of the trim and ballast tanks in a controlled manner to precisely trim the floatable parts and to ballast them down and up in the water. Examples of caissons and caisson sections which may be used in carrying out the present invention are described in applicant's PCT International Application published Dec. 8, 1994 under International Publication No. WO 94/28253, which is incorporated herein by reference.

The importance of the exact alignment of caissons, one to another, cannot be over emphasized. Caissons are large structures, and a tilt or "list" of even as little as 1° or 2° can result in one end of such a large structure being as much as 10 feet or more lower in the water than the other end. When it is realized that the depth of water available for floating such a caisson may be as little as 40 feet, a tilt of 10 feet (or 25%) towards one end can effectively eliminate use of such a caisson in practice. Gross ballasting alone cannot provide sufficiently precise trimming of such large structures, especially if they are to be used in such limited depths of water.

There is, however, an equally important additional reason to equip large caissons with precise trimming ability. It is the trimming ability that enables caissons to be precisely leveled one adjoining another. This is essential in order to keep transportation corridors (running down a length of caissons and between adjoining caissons and used for pipelines, conveyor belts, cables, etc.) in alignment.

In areas where earth tremors are prevalent, for example around the Pacific Rim where many of the new ports will be located, and/or where silt conditions prevail, the ability to refloat and realign caissons by ballasting up and precisely trimming in order to maintain alignment of any transportation corridors between the caissons takes on added importance.

The floatable caissons, caisson sections and caisson sectional components are manufactured under industrial, cost-controlled conditions in shipyards or shipyard-type facilities onshore and then floated out, towed to, and assembled at the port or harbor construction site. The caissons, caisson sections and caisson sectional components are finely trimmed while being ballasted down, which enables precise positioning and alignment of the caissons. The caissons are interconnected in desired configurations to construct a full range of marine structures and/or integrated marine structures/marine cargo terminals. Due to the provision of computer-controlled trim and ballast tanks, the caissons, caisson sections and caisson sectional components can be accurately positioned while being ballasted down or up at the installation site, enabling either on-site realignment, or removal for use at another location, scrapping, etc.

Adjoining caissons are interconnected by any suitable connecting means. Preferably, the facing ends of adjoining caissons are provided with connectors, such as interlocking connectors or other suitable means, to enable connection and disconnection of adjoining caissons. Shock absorbing means, such as fenders, bumpers and the like, are interposed between adjoining caissons to absorb and distribute impact forces between the caissons and, where necessary, to prevent the passage of water between the caissons.

An illustrative layout of various marine structures and integrated marine structures/marine terminals used to construct civil and naval/military port and harbor facilities is shown in FIG. 1. The port and harbor facilities include a breakwater pier A, bulkhead wharves B, a pier C, bulkhead wharves D, a wharf E, piers F and G, a breakwater pier H, and a breakwater I. These various marine structures are each described in more detail below with respect to their use and construction. In this illustrative layout, the port and harbor facilities are bounded by the breakwater piers A and H, and the breakwater I, with the breakwater I facing in the direction of the maximum weather arc.

The breakwater pier A is constructed of a line of breakwater/pier caissons 10 which project outwardly from the shore and through which run a series of pipelines 12. The breakwater/pier caissons 10 include two caissons 10a which constitute an intermodal liquid bulk products terminal for receiving liquid bulk products by tanker and storing the products for subsequent transshipment by tanker and/or by pipeline. The liquid bulk products may be of any type, such as jet fuel, gasoline, kerosene, diesel fuel, bulk chemicals, vegetable oils and the like. The two endmost caissons 10b in the line of caissons 10 constitute a liquid bulk gas terminal for receiving liquid gas by tanker and for refrigerated storage and subsequent transshipment as gas by pipeline and/or as liquid gas by tanker. The liquid bulk gases may be of any type, such as liquified natural gas (LNG), liquified petroleum gas (LPG), etc. The other caissons 10 are docking caissons and have a profile similar to that of the caissons 10a and 10b.

Figure 2:
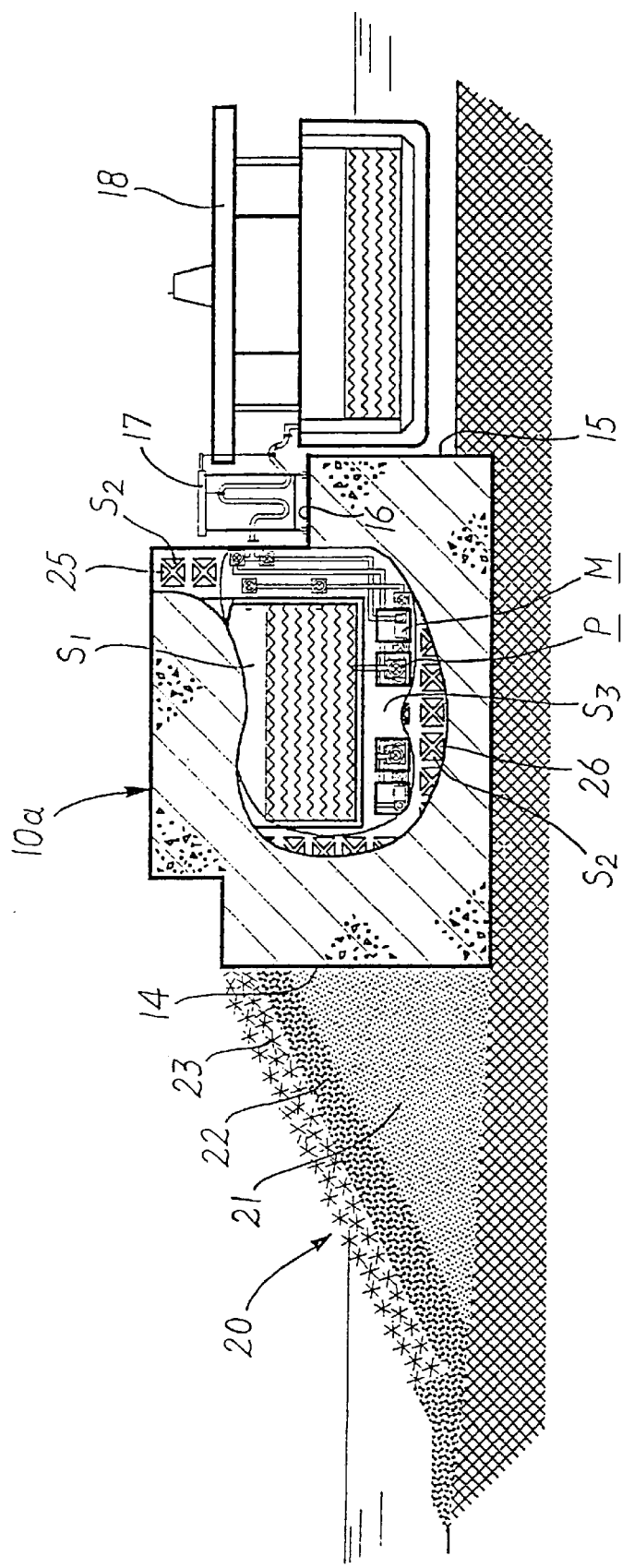
FIG. 2 is an end view of a breakwater/pier caisson, shown partly cut-away along section line 2—2 in FIG. 1.

FIG. 2 is an end view, partly cut-away along line 2—2 in FIG. 1, of a caisson 10a of the liquid bulk products terminal. The caisson 10a has a vertical weather or windward side 14 and a vertical leeward side 15. A breakwater 20 is provided on the windward side along the entire length of the line of caissons 10. The breakwater 20 may be of any type known in the art and, in the illustrated example, comprises an armored rubble mound breakwater comprised of core material 21 of sand, gravel and the like, one or more underlayers 22, and one or more outer armor layers 23 deposited over the underlayer 22. The vertical leeward side 15 enables vessels to dock as closely as possible alongside the terminal, while also providing necessary shelter from wind and waves. A horizontal apron 16 extends along the leeward side 15 and enables the optimal placement of material handling equipment and provides a transportation corridor along the length of the breakwater pier A. In this example, a portable hose carrier 17 is displaceable along the apron 16 and carries one or more flexible hoses for transferring liquid bulk products from a tanker 18 to internal, compartmentalized storage spaces $S_1$ within the caisson 10a. While only one storage space $S_1$ is shown in FIG. 2, a plurality of storage spaces $S_1$ are normally provided along the length of the modular caissons used in the present invention. The storage spaces $S_1$ are typically located between adjoining pairs of transverse bulkheads that extend transversely of the caissons, in spaced-apart relation from one another, along the length of the caissons.

In this example, the caisson 10a has a double-wall construction, and an array of trim tanks 25 and ballast tanks 26 are disposed between the two spaced-apart walls in spaces $S_2$ Motor-driven pumps (not shown) are connected through suitable piping and valving (not shown) to the trim and ballast tanks 25 and 26 to control the flow of liquid into and out of the tanks. In FIGS. 2–14, the trim and ballast tanks are shown through, and behind, the X-shaped structural members in the spaces $S_2$. A set of pumps P are driven by motors M and connected through suitable piping and valving, all of which components are housed in a space $S_3$, for directing and regulating the flow of liquid bulk products between the tankers and the compartmentalized storage spaces $S_1$, between the compartmentalized spaces themselves, as well as between adjacent caissons via pipeline corridors.

Figure 3:
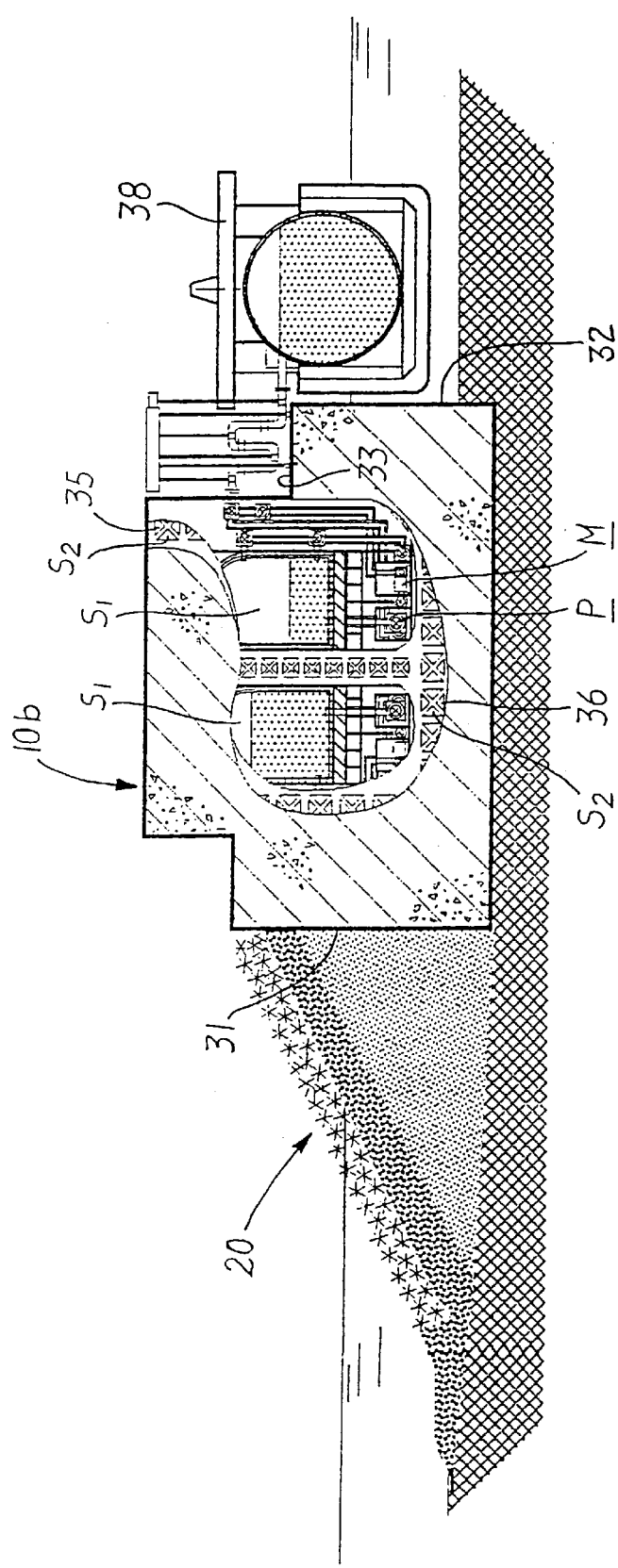
FIG. 3 is an end view of a breakwater/pier caisson, shown partly cut-away along section line 3—3 in FIG. 1.

FIG. 3 is an end view, partly cut-away along line 3—3 of FIG. 1, of one of the caissons 10b of the liquid bulk gas terminal. The caisson 10b has a profile similar to that of the caisson 10a and has a vertical windward or weather side 31, and a vertical leeward side 32 along which extends a horizontal apron 33. In this example, the internal storage spaces $S_1$ are suitably insulated and refrigerated by a refrigeration system to enable the refrigerated storage of liquid bulk gases. The caisson 10b is of double-wall construction, and trim tanks 35 and ballast tanks 36 are disposed in the spaces $S_2$ between the double walls. Suitable pumps, motors, piping and valving (not shown) are provided in the spaces $S_2$ between the double walls for controlling the flow of liquid to and from the trim and ballast tanks 35 and 36. In a space $S_3$, which extends beneath and alongside the storage spaces $S_1$, are disposed pumps P, motors M, piping, valving, etc. for controlling the flow of liquid bulk gases from tankers docked alongside the caisson 10b, such as the tanker 38, to the refrigerated storage spaces $S_1$ and from the storage spaces $S_1$ to pipelines or to other tankers for transshipment.

Referring again to FIG. 1, the bulkhead wharves B are comprised of integrated bulkhead/wharf caissons 40 designed to enable vessels to dock on one side thereof and act as a bulkhead to retain a filled area on the other side thereof. The caissons 40 are also designed to provide for cargo handling and storage. The bulkhead wharves B are comprised of two lines of bulkhead/wharf caissons 40a projecting outwardly from the shore, and a third line of bulkhead/wharf caissons 40b interconnecting the ends of the two lines of caissons 40a. The confined area bounded by the caissons 40a and 40b is filled with material dredged from the surrounding area, rocks, landfill and the like to define an intermodal dry bulk products terminal.

Figure 4:
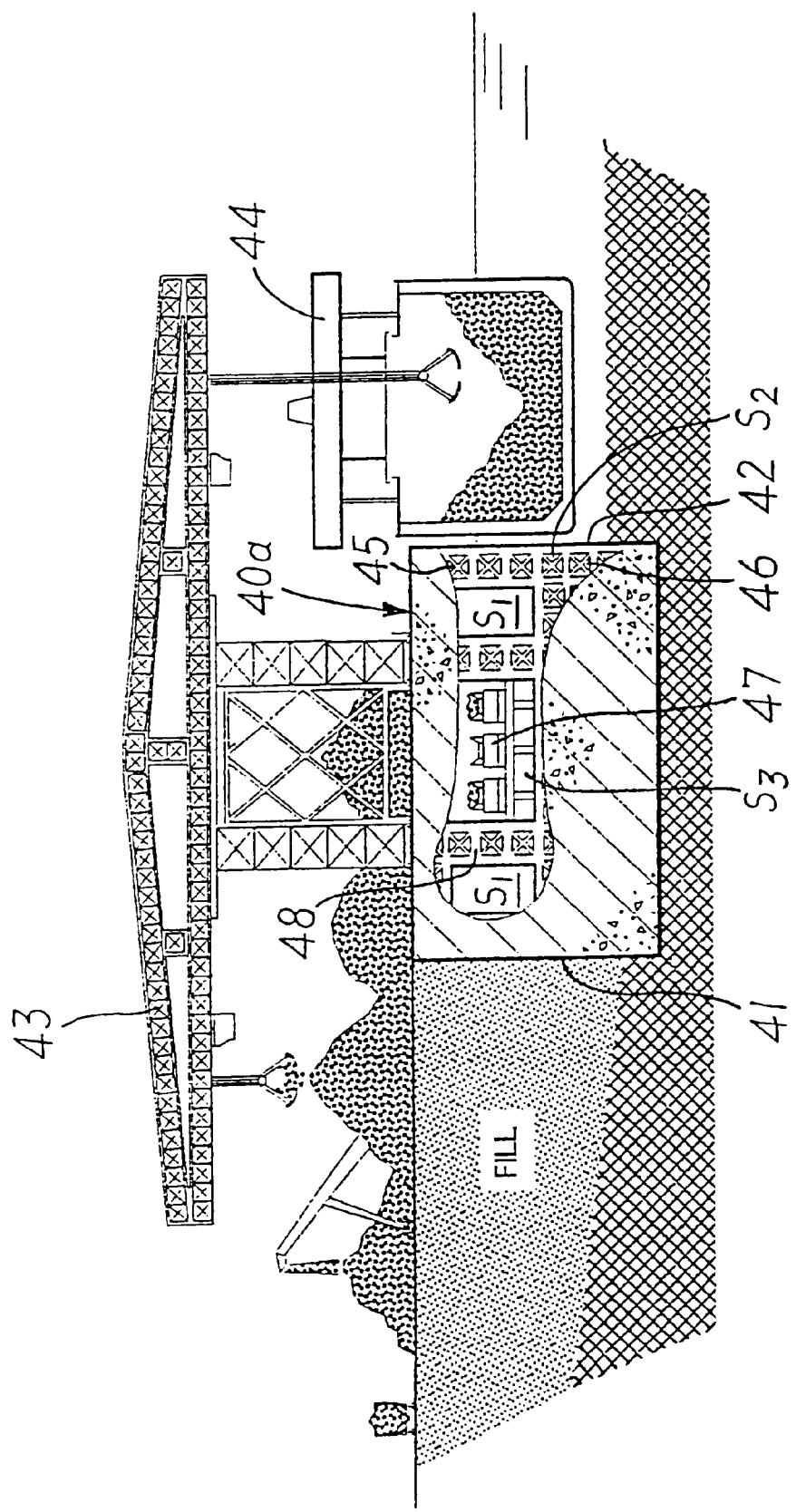
FIG. 4 is an end view of a bulkhead/wharf caisson, shown partly cut-away along section line 4—4 in FIG. 1.

FIG. 4 is an end view, partly cut-away along line 4—4 of FIG. 1, of one of the caissons 40a of the dry bulk products terminal. The caisson 40a has a vertical landward side 41 for confining the fill, and a vertical docking side 42. The vertical docking side 42 enables vessels to dock alongside the dry bulk products terminal. The top of the caisson 40a is in the form of a flat apron and supports material handling equipment, such as a gantry 43 for transferring dry bulk products from a bulk carrier 44 to the storage area of the dry bulk products terminal. In this example, the caisson 40a is of double-wall construction, and trim tanks 45 and ballast tanks 46 are disposed in the spaces $S_2$ between the two walls. The interior of the caisson 40a has large, compartmentalized storage spaces $S_1$ for material storage, and auxiliary spaces $S_3$ for housing material transporting means, such as internal conveyor systems 47, which run lengthwise of the caisson for transporting material to and from the storage spaces $S_1$ and, when necessary, to and between adjoining caissons.

The intermodal dry bulk products terminal receives dry bulk products by bulk carrier and transfers the products to open, above-the-ground storage areas for on-going transshipment by rail and/or barge. The dry bulk products may be of any type, including metallic ores (iron, manganese, nickel, etc.), alumina, coal, salt, phosphate, etc. The transfer of products to above ground storage for on-going handling by stackers/reclaimers can be done directly by grab bucket or alternatively by conveyor belts located in the space $S_3$.

Certain caissons, such as the caisson 40a, have one or more load bearing members, such as the load bearing members 48 of the caisson 40a, located longitudinally within the caissons, to absorb and effectively distribute any especially heavy loads that may be placed upon the caisson aprons. For example, these load bearing members are placed in FIGS. 4–7, directly beneath the legs (and rails) of dry bulk gantry or container cranes; and in FIGS. 8, 10 and 12, directly beneath the heavy duty "roadways" of the civilian and/or military/naval RO/RO and/or LO/LO terminals.

Figure 5:
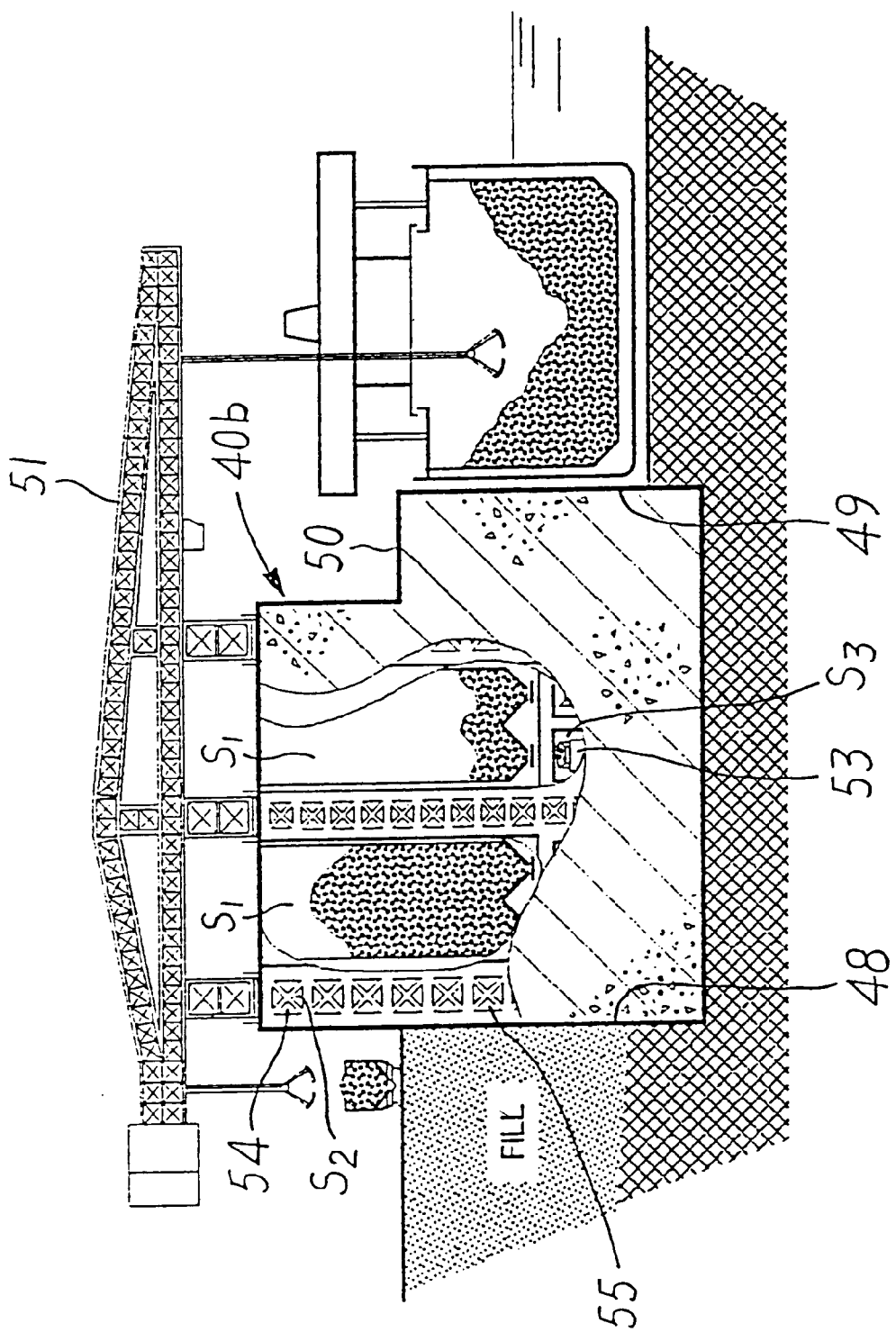
FIG. 5 is an end view a bulkhead/wharf caisson, shown partly cut-away along section line 5—5 in FIG. 1.

Another type of bulkhead/wharf caisson 40b is shown in FIG. 5, which is an end view partly cut-away along section line 5—5 of FIG. 1. The caisson 40b has a vertical landward side 48 which functions as a bulkhead for retaining fill, and a vertical docking side 49 to facilitate the docking of vessels alongside the terminal. A horizontal apron 50 extends lengthwise along the caisson on the docking side thereof. The caisson 40b has a double-wall construction, and an array of trim tanks 54 and ballast tanks 55 are housed in the spaces $S_2$ between the double walls. In this example, the caisson 40b has open storage spaces $S_1$, and material transfer means, such as a gantry 51, is mounted on the top of the caisson 40b to transfer dry bulk products from a bulk carrier 52 to the storage spaces $S_1$. The compartmentalized storage spaces $S_1$ are in the nature of storage silos with funnel-shaped bottoms through which the dry bulk products are gravity fed to material transporting means, such as internal conveyor systems 53 located in auxiliary space $S_3$, for transporting the products lengthwise along the caisson 40b for movement by conveyor belt corridors to other silos, to other caissons, and/or to other out-loading facilities (not shown).

The intermodal dry bulk products terminal comprised of the caissons 40b receives dry bulk products by bulk carrier and stores the products in storage silos for subsequent transshipment by vessel, barge, rail, etc. All types of dry bulk products may be stored and transferred at the dry bulk products terminal, including sintered metals, alumina, crushed glass, sand, aggregates, fertilizer materials, grains, cement, etc. Most dry bulk materials can be handled by grab bucket and stored in partially enclosed storage silos. Certain finer materials, such as grains, cement and the like, require protection from the weather and must be stored in closed storage silos (not shown). The finer materials can be transported by pneumatic means as well as by conveyor belt or other mechanical transporting means.

Figure 6:
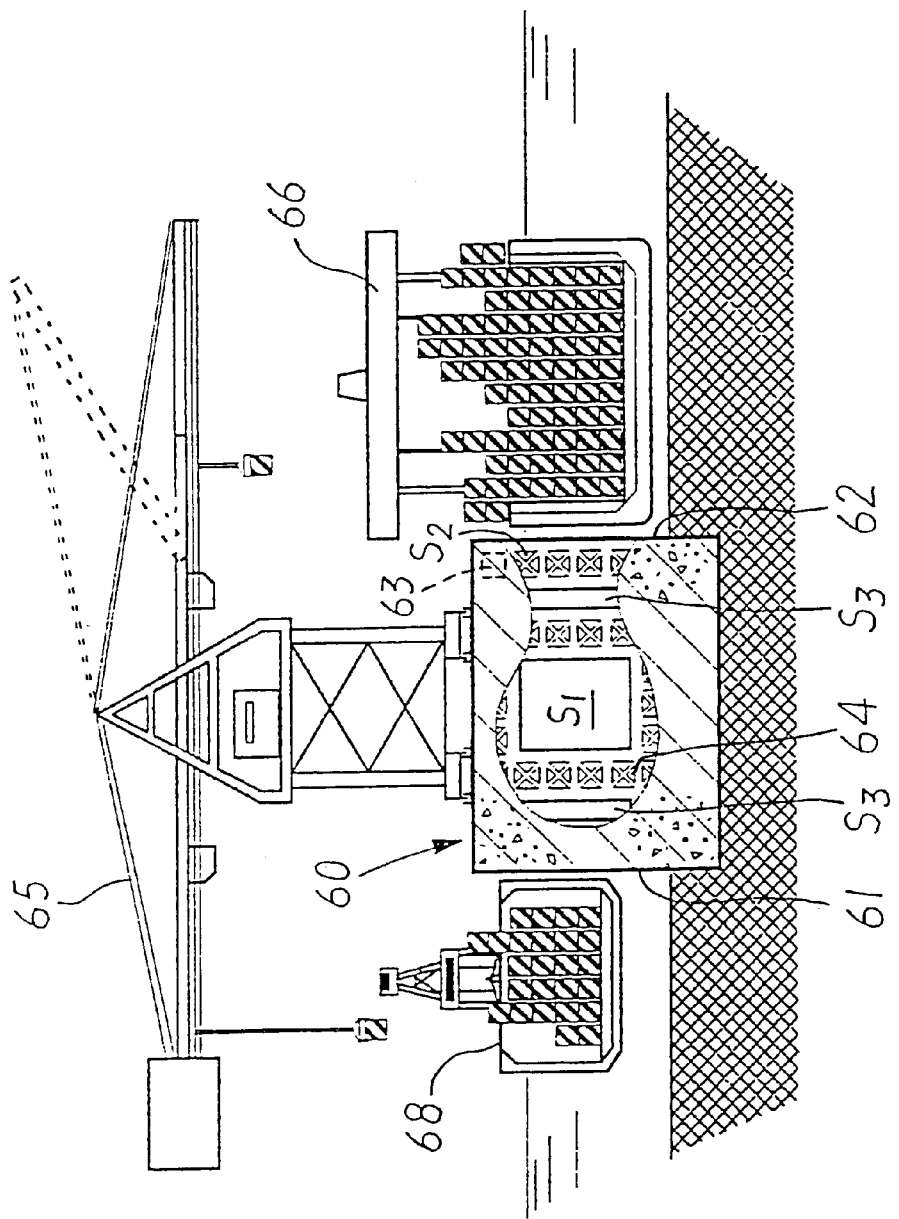
FIG. 6 is an end view of a pier caisson, shown partly cut-away along section line 6—6 in FIG. 1.

The pier C is constructed of a line of pier caissons 60 extending outwardly from the shore. FIG. 6 is an end view of one of the pier caissons 60 and is shown partly cut-away along line 6—6 in FIG. 1. The caisson 60 has opposed vertical sides 61 and 62, which enable vessels to dock along either side of the pier. The caisson 60 has a double-wall construction, and trim tanks 63 and ballast tanks 64 are housed in the spaces $S_2$ between the double walls. The caisson is provided with compartmentalized interior storage spaces $S_1$ for the temporary storage of containers and/or storage of materials and/or for housing material processing/treating equipment, and auxiliary spaces $S_3$ for fuel storage, maintenance parts and supplies, transportation corridors, and other auxiliary support functions. In this example, a container cargo crane 65 is movable along guideways such as rails or the like on the top of the caisson 60 for directly transferring cargo from a container vessel 66 to a container barge 68 and vice versa. The crane 65 has hoisting apparatus for lifting and lowering cargo.

The caissons 60 of the pier C constitute an intramodal marine container terminal which receives container cargo from one marine vessel, such as a container vessel or container jumbo barge, and transfers the container cargo by crane or other suitable cargo transferring means to another marine vessel, such as a container jumbo barge or container vessel.

The bulkhead wharves D are comprised of bulkhead/wharf caissons 70 arranged in a partially closed loop to define a confined area which is filled with dredge material, rocks, landfill, soil and the like. Two lines of caissons 70 extend outwardly from the shore, and the other ends of the two lines of caissons are interconnected by a third line of caissons 70. Each of three lines of caissons constitutes a bulkhead/wharf. For illustrative purposes, two different types of intermodal container terminals are shown in FIGS. 7 and 8.

Figure 7:
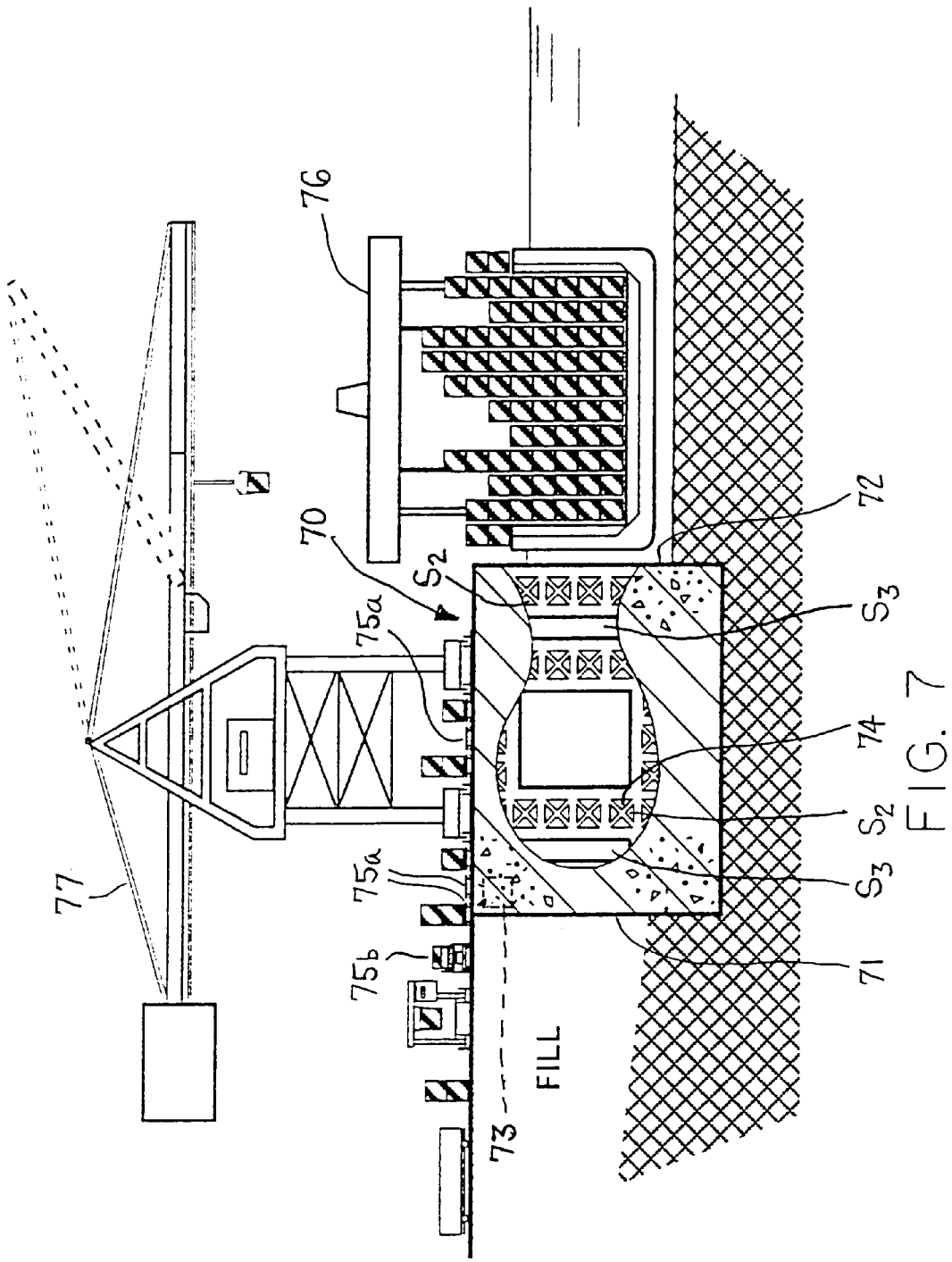
FIG. 7 is an end view of a bulkhead/wharf caisson, shown partly cut-away along section line 7—7 in FIG. 1.
Figure 8:
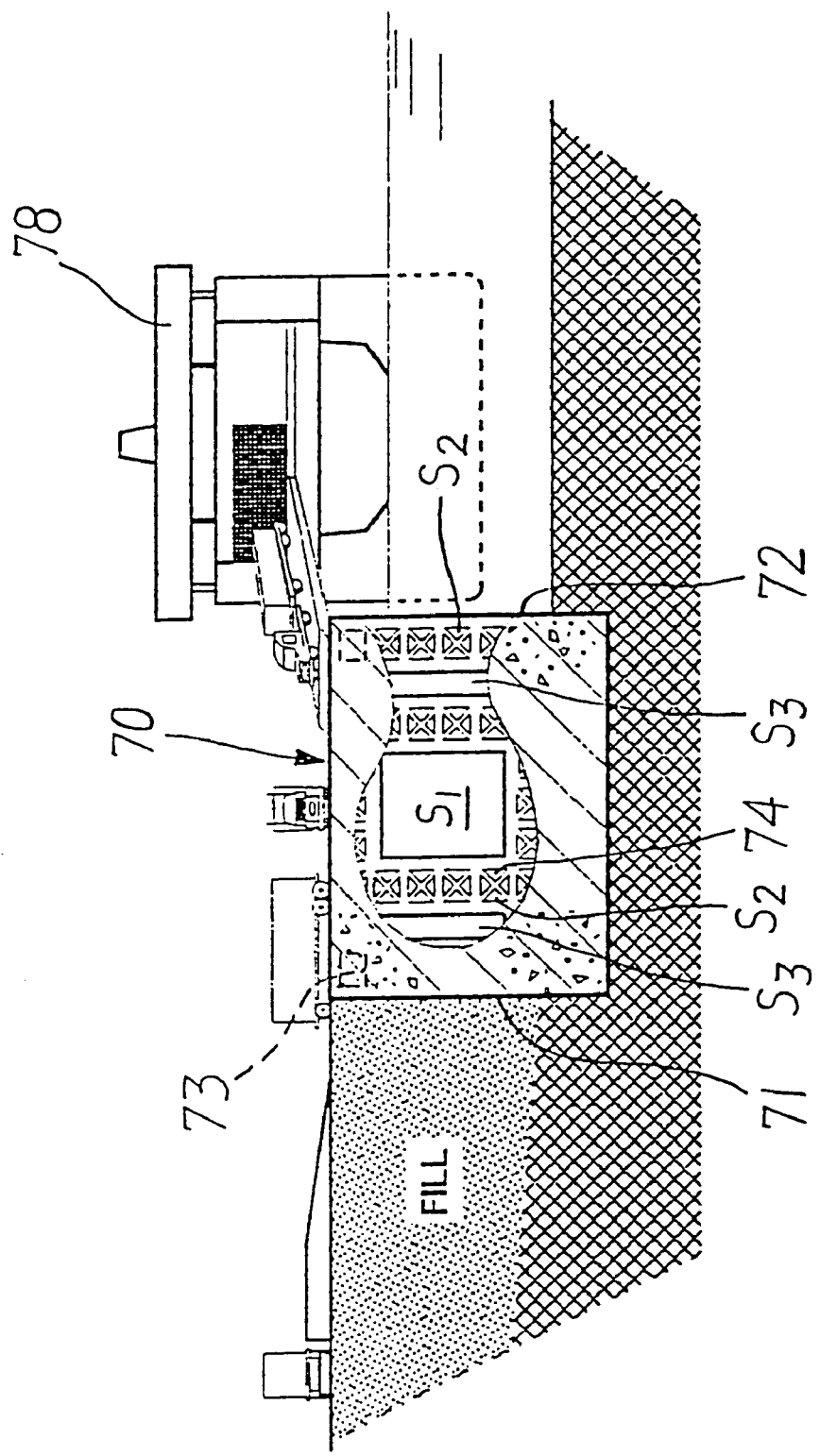
FIG. 8 is an end view of a bulkhead/wharf caisson, shown partly cut-away along section line 8—8 in FIG. 1.

FIG. 7 is an end view of one of the caissons 70, shown partly cut-away along section line 7—7 in FIG. 1. In this embodiment, the bulkhead/wharf caissons 70 have the same construction as that of the pier caissons 60, which is desirable from the standpoint of reducing the total number of different caisson designs thereby reducing the costs of manufacture. The caisson 70 has opposed vertical sides 71 and 72. The vertical landward side 71 functions as a bulkhead to contain the fill, and the vertical docking side 72 enables vessels to be docked closely alongside the terminal. The caisson 70 is of double-wall construction, with trim tanks 73 and ballast tanks 74 being disposed in the spaces $S_2$ between the two walls. The interior of the caisson 70 is divided into compartmentalized storage spaces $S_1$ and $S_3$.

In this example, the intermodal container terminal receives container cargo from a marine container vessel 76 and directly transfers the cargo by a crane 77 or other suitable cargo transferring means to land-side vehicles, such as railcars 75*a* or trucks 75*b*. As shown in FIG. 7, the crane 77 has hoisting apparatus for lifting and lowering cargo. In addition, the crane 77 may transfer the cargo from the marine cargo vessel 76 to an open, above-the-ground storage area for subsequent transshipment by truck, rail and/or barge. Alternatively, the crane 77 may directly transfer cargo from the railcars 75*a* and/or trucks 75*b* to the marine cargo vessel 76. If sufficient adjoining space is available for cargo aircraft runways and support facilities, the terminal may also be an intermodal sea-air hub terminal.

As shown in FIG. 7, the railcars 75*a* ride along rails or tracks which preferably run generally parallel to the docking sides 72 of the caissons 70. While three sets of rails are illustrated in this example, it is understood that more or less than three sets of rails may be employed, and that the rails may run beneath the crane 77, as shown, and/or alongside the crane. The crane 77 rides along guideways such as rails or the like which are parallel to the rails along which the railcars 75*a* ride thereby enabling the crane 77 to move back and forth along the length of the marine cargo vessel 76 to directly transfer cargo from the vessel to the lines of railcars 75*a* and/or trucks 75*b* in a highly efficient manner.

The implementation of a pier, such as the pier C, for directly transferring cargo between two marine vessels, and the implementation of a wharf, such as the bulkhead wharves D and the wharf E, for directly transferring cargo between a marine vessel and a land-side vessel (such as railcars and trucks) can according to the present invention be carried out using piers and wharves of any construction and are not limited to using modular caissons.

FIG. 8 shows another example of an intermodal container terminal comprised of the bulkhead/wharf caissons 70. In this example, the intermodal container terminal is a roll on/roll off (RO/RO) terminal which receives container cargo by an RO/RO vessel 78 and transfers the cargo to open, ground level, storage areas by truck for subsequent transshipment by truck, barge and/or rail.

Figure 9:
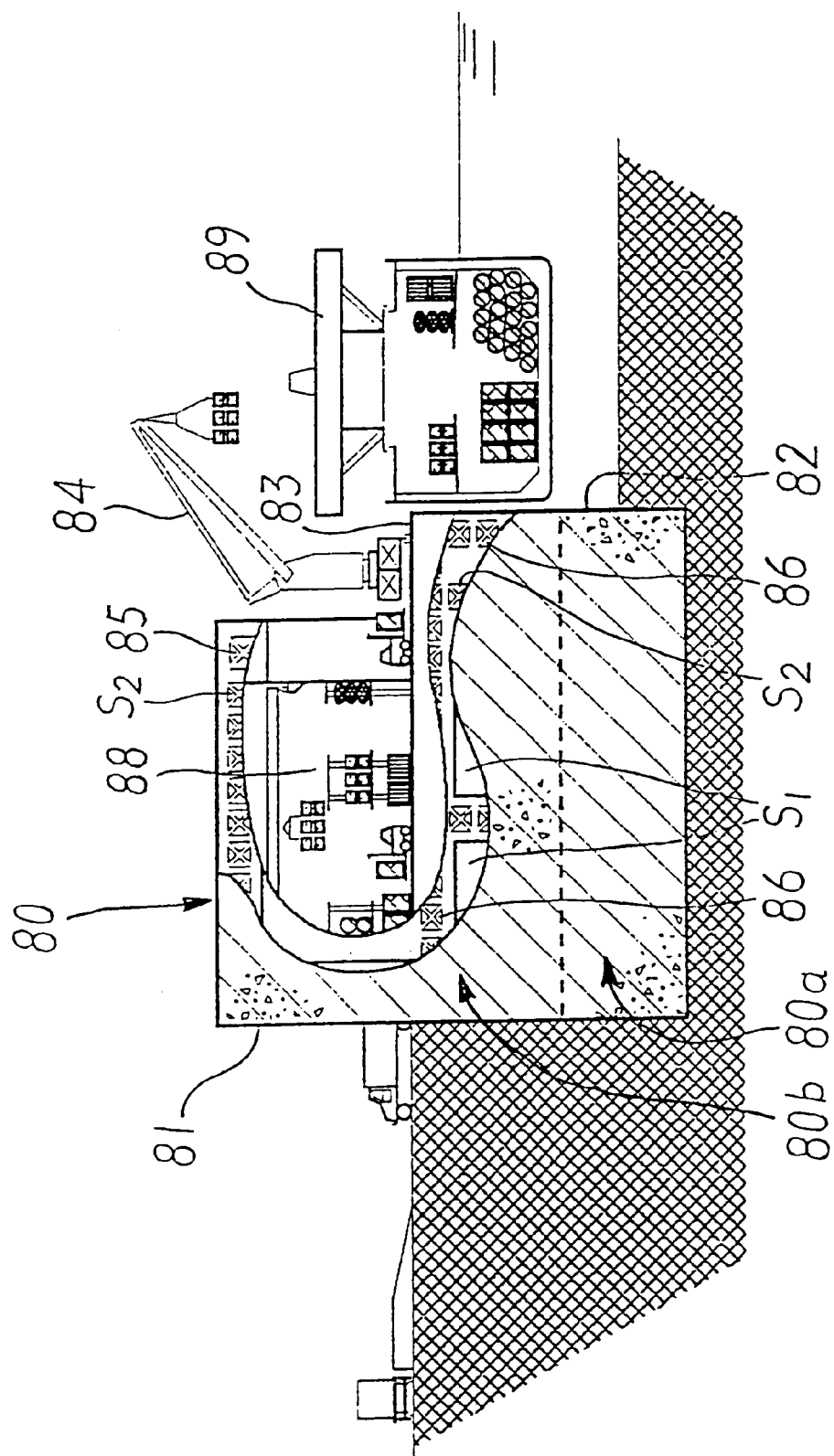
FIG. 9 is an end view of a wharf caisson, shown partly cut-away along section line 9—9 in FIG. 1.

The wharf E is comprised of wharf caissons 80. FIG. 9 is an end view of one of the caissons 80, shown partly cut-away along section line 9—9 in FIG. 1. The wharf caisson 80 has a vertical landward side 81 which abuts the land, and a vertical docking side 82 to facilitate the docking of vessels alongside the terminal. A horizontal apron 83 extends lengthwise along the docking side 82 of the caisson 80 to provide a transportation corridor and to permit the optimal placement of material handling equipment, such as a cargo crane 84. The caisson 80 has a double-wall construction with trim tanks 85 and ballast tanks 86 disposed in the spaces $S_2$ between the two walls. In the interior of the caisson 80, at a depth below ground level, are provided internal storage spaces $S_1$ for the storage of materials and/or for housing material processing/treatment equipment.

In this example, due to the height of the caisson 80 and the relatively shallow depth of water at the terminal site, the caisson 80 is constructed of two caisson sections 80*a* and 80*b*. During assembly, the lower caisson base section 80*a* is towed to the site first, and then trimmed and ballasted down into position. Then the upper caisson section 80*b* is towed to the site, and trimmed and ballasted down into position atop the caisson base section 80*a*. The upper caisson section 80*b* has a large, enclosed storage shed 88 whose floor is at the same elevation as the apron 83. The enclosed storage shed 88 has entrance and exit openings along the opposed vertical sides thereof to permit cargo to be unloaded from a cargo vessel 89 and transferred by the cargo crane 84 to the above-the-ground storage area within the enclosed storage shed of the caisson 80, where the general cargo is broken down to smaller units for transshipment by truck, barge and/or rail. Depending on draft constraints, the upper caisson section can be set in place without the storage shed, which can be constructed on the upper caisson section later.

The caissons 80 constitute an intermodal general cargo/break bulk terminal which receives general cargo by vessel, transfers the cargo by crane to the enclosed storage shed where it is broken down to smaller units for subsequent transshipment by truck, barge and/or rail.

Figure 10:
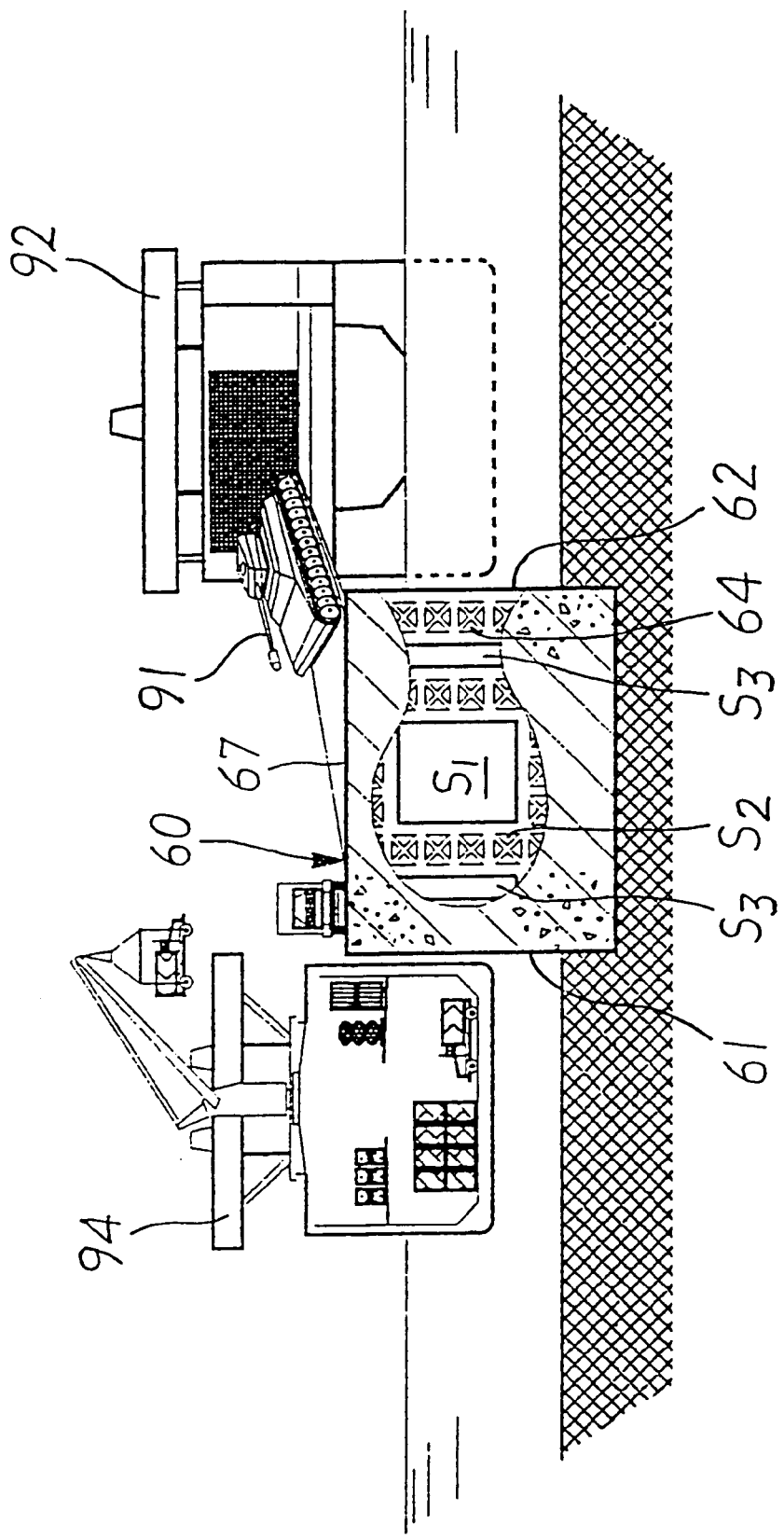
FIG. 10 is an end view of a pier caisson, shown partly cut-away along section line 10—10 in FIG. 1.

The pier F is comprised of pier caissons 60 like those used in constructing the pier C and the bulkhead wharves D shown in FIGS. 6–8. In this case, however, the caissons 60 extend in a line from the shore and constitute an intermodal roll on/roll off (RO/RO) and lift on/lift off (LO/LO) terminal, which is particularly suitable for naval/military use for rapidly transferring equipment from transport vessels to shore. In the example illustrated in FIG. 1, the pier F is connected to a naval/military pier and equipment pool 90. As shown in FIG. 10, which is an end view of one of the caissons 60 of the pier F, shown partly cut-away along section line 10—10 in FIG. 1, the top of the caisson 60 defines a transport apron 67 for transporting naval/military cargos and equipment, such as a tank 91, from an RO/RO transport ship 92 docked alongside the terminal. Similarly, naval/military cargos and equipment can be transferred from the naval/military pier and equipment pool 90 to the transport ship 92. The caisson 60 can also be used to transfer naval/military cargos and equipment from an LO/LO vessel 94 to and from the naval/military pier and equipment pool 90.

In this example, the integrated pier caissons 60 comprise an intermodal RO/RO and LO/LO terminal which receives naval/military cargos and equipment by RO/RO transport ships and LO/LO vessels for rapid transfer along the apron of the terminal to shore. A similar integrated caisson system can be used as a ferry terminal for passengers, cars, trucks, etc.

Figure 12:
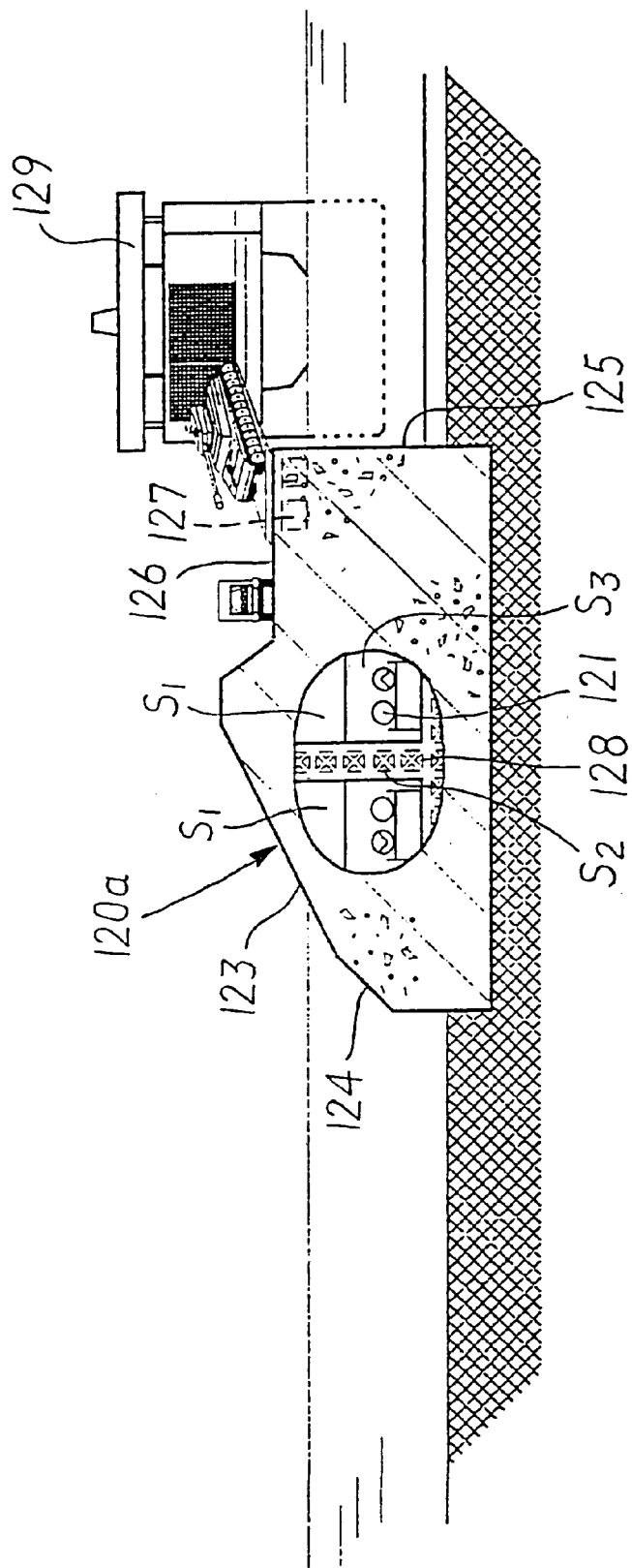
FIG. 12 is an end view of a breakwater/pier caisson, shown partly cut-away along section line 12—12 in FIG. 1.

Pier and breakwater/pier caissons that can be used in military/naval rapid deployment situations are shown in FIGS. 10 and 12. Such caissons can be pre-positioned, for example, at Diego Garcia in the Indian Ocean, for subsequent rapid deployment anywhere along the coasts of the Middle East, South Asia, Southeast Asia or the East Coast of Africa. Such caissons can also be pre-supplied in the storage spaces $S_1$ and $S_3$ with military/naval stores, supplies, ammunition and equipment. The larger spaces $S_1$ can alternatively be used to house maintenance and repair functions for the wheeled vehicles using the heavy duty "roadways" running topsides to the beachhead along the caisson aprons.

Figure 11:
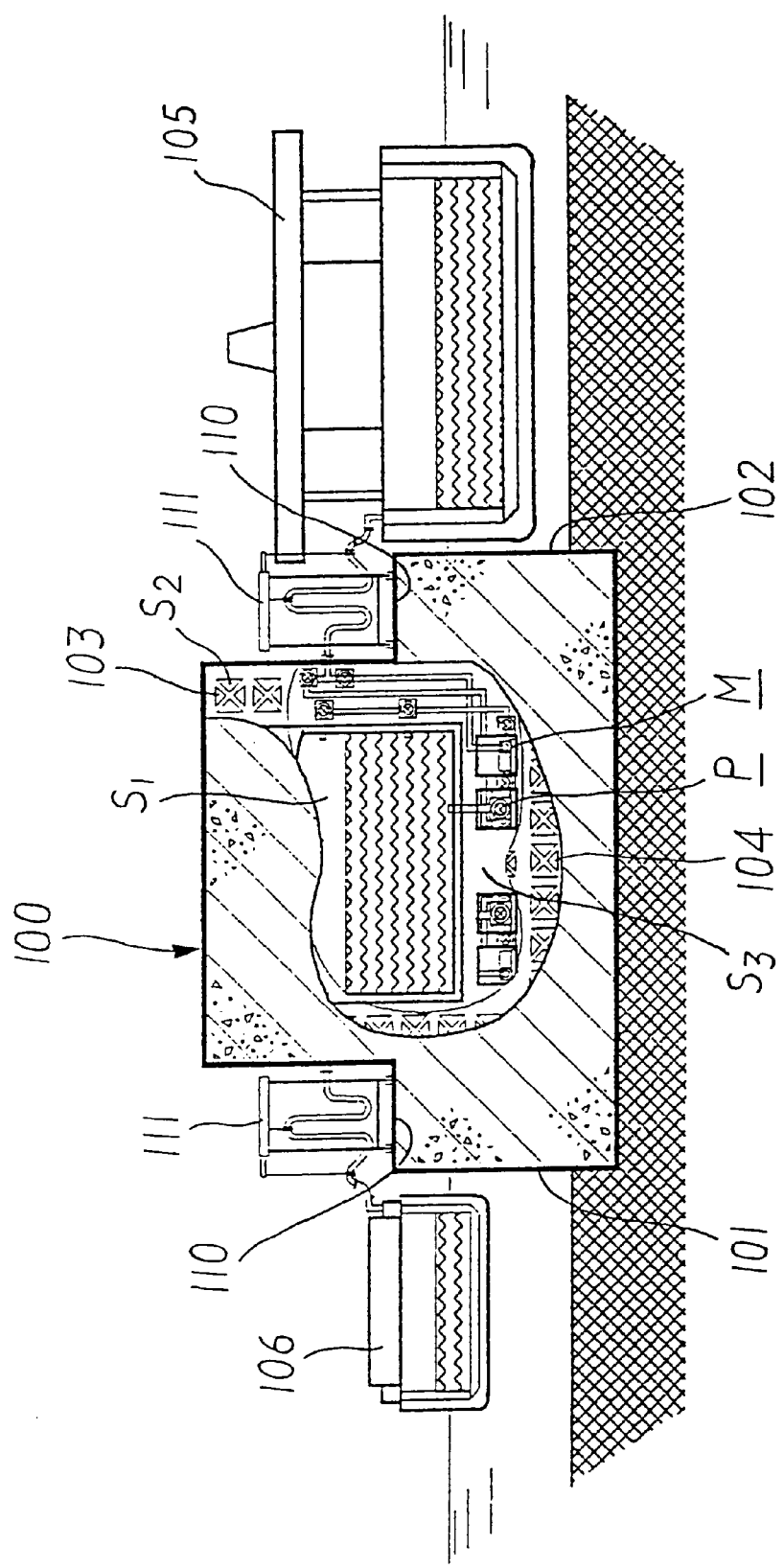
FIG. 11 is an end view of a pier caisson, shown partly cut-away along section line 11—11 in FIG. 1.

The pier G is comprised of two pier caissons 100 which extend in a line from the shore. FIG. 11 is an end view of one of the caissons 100, shown partly cut-away along section line 11—11 in FIG. 1. The pier caisson 100 is similar to the breakwater/pier caisson 10a shown in FIG. 2 except that in the case of the caisson 100, the horizontal aprons on both sides of the caisson are at the same elevation. The caisson 100 has a pair of opposed vertical sides 101 and 102 to enable docking of vessels along either side of the caisson. The caisson 100 has a double-wall construction, and trim tanks 103 and ballast tanks 104 are disposed in the spaces $S_2$ between the two walls. Housed within auxiliary space $S_3$ are a set of pumps P driven by motors M and connected through suitable piping and valving for controlling the flow of liquid bulk products from, for example, a tanker 105 to compartmentalized storage spaces $S_1$ within the caisson 100, and from the storage spaces $S_1$ to a barge 106 or through pipelines 107 to storage tanks 108 located on shore. The pipelines 107 extend along the length of the pier G through the interior of the caissons 100 in the space $S_3$ beneath the storage spaces $S_1$. Horizontal aprons 110 extend along both sides of the caisson 100, and portable hose carriers 111 are displaceable along the aprons 110 and carry flexible hoses for transferring liquid bulk products from the vessels to the storage spaces $S_1$.

The pier caissons 100 of the pier G constitute an intermodal liquid bulk products terminal for receipt by tanker and/or pipeline of liquid bulk products and storage of the products for subsequent transshipment by barge, pipeline, etc. The terminal can handle all types of liquid bulk products, such as jet fuel, gasoline, kerosene, diesel fuel, bulk chemicals, vegetable oils, etc.

The breakwater pier H is comprised of two types of breakwater/pier caissons 120a and 120b. The caissons 120a and 120b extend in a line outwardly from the shore. Pipelines 121 extend from the storage tanks 108 through the caissons 120a and 120b throughout the length of the breakwater H. As described below, the caissons 120a constitute an RO/RO and/or LO/LO terminal, and the caissons 120b constitute a deep-water crude oil terminal.

FIG. 12 is an end view of one of the caissons 120a, shown partly cut-away along section line 12—12 in FIG. 1. The caisson 120a has a sloped windward or weather side having an upper sloped surface 123 of relatively gradual rise and a lower sloped surface 124 of relatively steep rise. The caisson 120a has a vertical docking side 125, which enables vessels to dock alongside the terminal. A horizontal apron 126 extends lengthwise along the leeward side of the caisson 120a and serves as a transportation corridor. The caisson 120a is of double-wall construction, and trim tanks 127 and ballast tanks 128 are disposed in the spaces $S_2$ between the double walls. The pipelines 121 are disposed in auxiliary space $S_3$ and extend lengthwise through the line of caissons 120a and 120b, and the interior of the caissons above the pipelines 121 is compartmentalized into storage spaces $S_1$.

In this example, the caissons 100a constitute an intermodal RO/RO and/or LO/LO terminal which receives naval/military equipment and cargos by an RO/RO transport ship 129 or by an LO/LO vessel for rapid transfer along the apron 105 to shore. In a similar manner, the RO/RO and/or LO/LO terminal may be used to rapidly transfer naval/military equipment and cargos from shore to transport ships and vessels.

Figure 13:
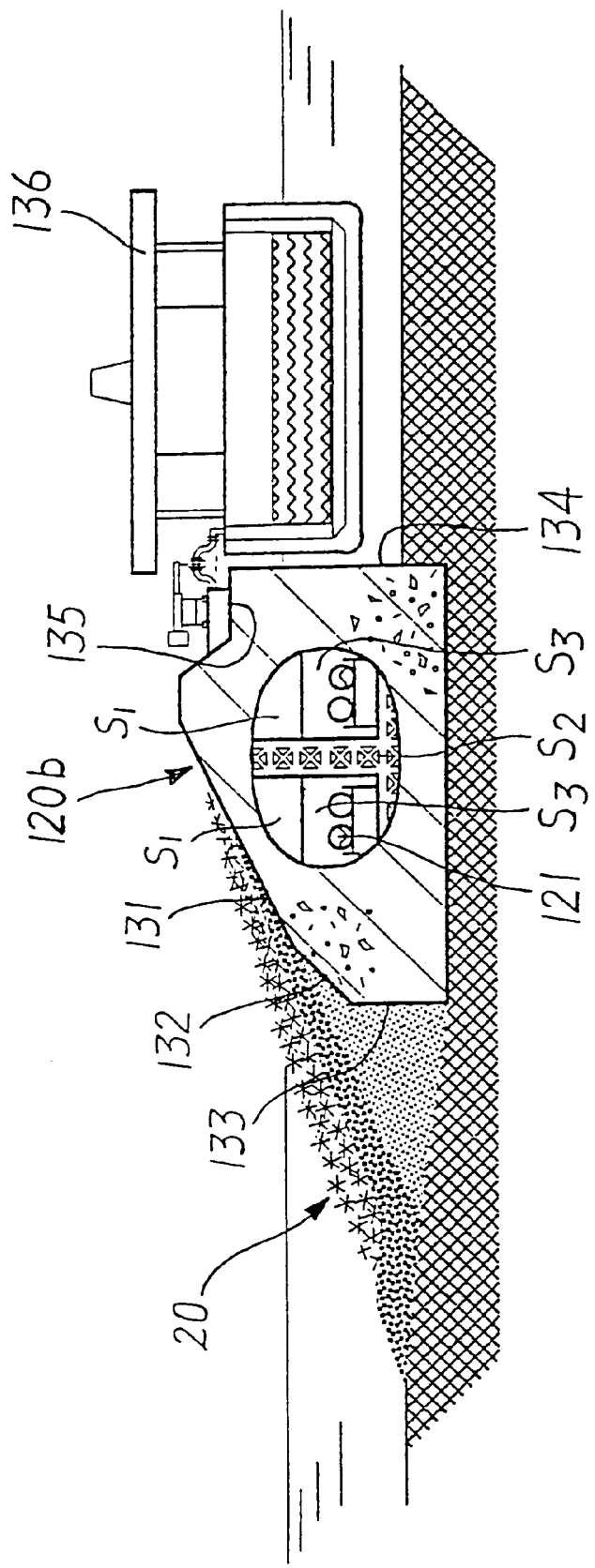
FIG. 13 is an end view of a breakwater/pier caisson, shown partly cut-away along section line 13—13 in FIG. 1.

FIG. 13 is an end view of one of the caissons 120b, shown partly cut-away along section line 13—13 in FIG. 1. The caisson 120b is similar in construction to that of the caisson 120a except that the caisson 120b has a narrower width or lateral dimension because the caisson 120b does not require a wide horizontal apron to serve as a transportation corridor. As shown in FIG. 13, the caisson 120b has a sloped windward side comprised of an upper sloped surface 131, a lower sloped surface 132 and a vertical surface 133. A rubble mound breakwater 20 is provided on the windward side of the caisson 120b. The caisson 120b has a vertical leeward side 134 to permit vessels to dock alongside the terminal, and a horizontal apron 135 for the placement of equipment, vehicles and the like which are needed at the terminal. The pipelines 121 are disposed in auxiliary space $S_3$ and extend lengthwise through the line of caissons 120b, and the interiors of the caissons above the pipelines are compartmentalized into storage spaces $S_1$.

In this example, the caissons 120b of the breakwater pier H constitute an intermodal deep-water liquid bulk products terminal for receipt by tanker, such as a tanker 136, of liquid bulk products, such as crude oil, and transshipment by pipeline to the tanks 108 in the tank farm on shore.

The breakwater I is comprised of wave defense caissons 140, several examples of which are shown in FIG. 14. FIG. 14a is an end view of one of the caissons 140, shown partly cut-away along section line 14—14 in FIG. 1. The wave defense caisson 140 has a tapered cross section that tapers outwardly in the downward direction on both the windward and leeward sides 141 and 142 of the caisson. In this example, the slope of the windward side 141 is the same as that of the leeward side 142, and the two sides slope outwardly for a major part of their downward extent. The top part of the caisson 140 is truncated and has a generally horizontal ledge 143 connected to the upper end of the windward side 141, and a tapered ridge portion 144 connected to the upper edge of the leeward side 142. Alternatively, the tapered ridge portion 144 can be omitted (as indicated by dashed lines) so that the top of the caisson 140 is generally flat across its top surface.

The caisson 140 is of double-wall construction, and trim tanks (not shown) are disposed in the spaces $S_2$ at the upper corners of the caisson and ballast tanks 146 are disposed in the spaces $S_2$ between the two walls. The interior of the caisson 140 is divided into storage spaces $S_1$ for the long-term storage or entombment of contaminated materials, such as dredge material containing mercury, lead, dioxins or other contaminants.

FIG. 14a illustrates the case where the caissons 140 are sufficient, by themselves, to withstand the maximum hydrodynamic and weather conditions at the site of installation. FIG. 14b illustrates the case where a rubble mound breakwater 20 is provided on the windward or weather side of the line of caissons 140, whereby the hydrodynamic forces to which the caissons would otherwise be subjected are greatly reduced. As a result, this enables the design weight and structure, and the corresponding construction cost, of the caissons to be significantly reduced. In FIG. 14c, rubble mound breakwaters 20 are provided along the line of caissons 140 on both the windward and leeward sides thereof. The use of breakwaters on both the windward and leeward sides would be required at a site having more severe hydrodynamic and weather conditions than would be experienced by the systems shown in FIGS. 14a and 14b.

The line of caissons 140 which form the breakwater I constitute a so-called "dumb" terminal for the long-term storage of material, especially contaminated material which must be entombed for long periods of time but which may, if desired, be removed from the storage spaces S for subsequent processing.

In the port and harbor layout shown in FIG. 1, the breakwater I together with the breakwater piers A and H constitute a wave defense system capable of withstanding maximum force winds and waves generated at the port and harbor site. The breakwater I faces the maximum weather arc, and the two breakwater piers A and H extend outwardly from shore to an area behind the leeward side of the breakwater I, thereby providing a fully protected and sheltered area for port and harbor activities.

The various caissons described above with reference to FIGS. 1–14 are comprised of floatable parts, either caissons, caisson sections or caisson sectional components, which are provided with trim and ballast tanks. Suitable piping, pumps, motors, valves and controls are housed within each of the floatable parts and are controlled by a computer, microcontroller or microprocessor to selectively and individually pump fluids into and out of the trim and ballast tanks in a controlled manner to precisely trim the floatable parts and to ballast them down and up in the water. This enables the caissons to be rapidly deployed to a desired site and integrated to form numerous types of marine terminals. The terminals may be disassembled by ballasting up and towing away the caissons, which may then be used at another site. The potential for rapid deployment and assembly of the terminals and the potential for rapid disassembly and removal to another site could find widespread use in many naval and military applications.

The various marine terminals A, B, C, D, E, F, G and H can be constructed of sufficient size to accommodate the largest commercial vessels presently in use worldwide as well as even larger vessels being developed for use in the future. For example, the marine terminals can be constructed to handle Post-Panamax vessels with a capacity of 4500–6000 TEUs (1 TEU=Twenty-foot Equivalent Units, which is the standard container size) and Super Post-Panamax vessels with a capacity of 6000–8000+ TEUs. Such large container ships require drafts in excess of 50 feet (MLW).

To demonstrate some of the benefits and advantages realized by the modular caissons of the present invention, a comparison will be given of a port construction using the inventive caissons with one using conventional caissons. For this comparison, the port construction project currently in progress at Hitachi-Naka, Japan, just south of Hitachi City, will be used. This project has been underway since 1991 and involves the construction and use of caissons weighing 8,000 tons (100 feet in length, 90 feet in width and 72 feet in height).

These caissons are being manufactured at an onshore construction yard for installation as part of a composite breakwater for a new port being built at the same location. This composite breakwater is being built in 80 feet of water (at mean low water) in the open sea at Hitachi-Naka off the Pacific Coast of Japan at a site that is fully exposed to typhoon waves and winds. This is a hostile marine environment, and the construction of this breakwater represents the outer edge of existing civil/marine engineering technology in the world today.

In this project, the construction/installation system being used consists of:

(1) Construction of the caissons at the onshore yard;

(2) Transfer of the caissons across the yard onto a floating dry-dock by means of a compressed air slide system; and (3) Transport of the caissons in the floating dry-dock to the breakwater installation site.

There are several major problems with this system that precludes its use other than in the immediate vicinity of the construction yard, which is the case at Hitachi-Naka. These problems are:

(1) The draft of the floating dry-dock, once loaded with a caisson, far exceeds the depth of water available at any shipyard, or in any adjacent navigation channels to a shipyard, anywhere in the world. For example, the draft of the loaded dry-dock at Hitachi-Naka is such that it requires a channel depth of 80 feet to enable it to be towed to the installation site. There is only one port in the world that has this depth of water (Rotterdam at Maasvlacht). There are no shipyards in the world with this float-out depth of water. One has to go to fjords such as Stavanger in Norway or Come-By-Chance in Newfoundland to obtain such depths. (2) The metacentric height of the loaded dry-dock is such that it cannot be used other than in calm conditions with minimum waves and wind. If the 8,000 ton caisson "cargo" were to shift, which would be likely in anything other than calm conditions, the loaded dry-dock could capsize. As a result, the dry-dock's design precludes its use for transporting caissons other than in the immediate vicinity of the construction yard (which is the case at Hitachi-Naka). When it is realized that the caissons of the present invention, even in shallow-draft configuration, can weigh two or three times the weight of the Hitachi-Naka caissons, the feasibility of using the floating dry-dock concept with heavier caissons becomes even more remote. For example, it would require a navigation channel (between construction yard and installation site) with a depth of 100 feet to use the floating dry-dock concept to transport caissons weighing two-three times that of the Hitachi-Naka caissons.

The caissons of the present invention effectively overcome the problems associated with the Hitachi-Naka caissons due to the following differences:

(1) The inventive caissons (or caisson sections or caisson sectional components) have sufficient buoyancy, especially in their shallow-draft configuration, to be floated out of construction yards in depths of water (MLW) of 50 feet or less.

(2) Unlike the Hitachi-Naka caissons, where the trim and ballast tanks, pumps, motors, piping and computer controls are mounted in the floating dry-dock, in the inventive caissons these functions are located in spaces $S_2$ and $S_3$ specifically designed in the caissons, preferably within longitudinal double walls.

(3) The caissons of the present invention have length-to-width and length-to-height ratios and a corresponding metacentric height that enables them to be towed or pushed by sea-going tugs, even in Beaufort Scale 4–5 conditions.

These differences are critical from a business standpoint. The high capital cost of the caisson construction yard and floating dry-dock system at Hitachi-Naka have to be written off against just one project, the port of Hitachi-Naka itself.

By contrast, a caisson construction yard for producing caissons according to the present invention can be located in the Far-East, for example, in Japan or in South Korea or Taiwan or Singapore. Such a caisson yard could produce caissons for towing to new port and harbor construction sites anywhere in the Far-East, and even to remote locations in Southeast Asia or South Asia. The reason for this is simple. As Japanese, Norwegian and Dutch marine constructors and service fleet operators have already proved, once large, heavy marine structures are towed "up-to-speed", because of their momentum, such structures can be towed great distances at relatively low cost. Thus, while a large caisson yard for the standardized production of caissons is capital intensive, this cost can be written off against a number of such port projects as against just one.

The present invention has been described with reference to one particular port and harbor layout and particular embodiments of marine terminals. Other layouts and other types of marine terminals, as well as obvious variations and modifications to the caissons, will be readily apparent to those of ordinary skill in the art. The present invention is intended to cover all such obvious variations and modifications which fall within the spirit and scope of the appended claims.

I claim:

1. A wharf extending into water at a port or harbor site, the wharf comprising: a docking side extending into the water and having a shape and length effective to enable marine vessels to dock alongside the wharf; one or more sets of rails running along the wharf for receiving thereon railcars; and cargo transferring means movable lengthwise along the wharf for directly transferring cargo from a vessel docked alongside the wharf to railcars on the one or more sets of rails.

2. A wharf according to claim 1; wherein the one or more sets of rails include at least one set of rails running along the wharf beneath the cargo transferring means.

3. A wharf according to claim 2; wherein the one or more sets of rails include plural sets of rails running along the wharf beneath the cargo transferring means.

4. A wharf according to claim 3; wherein the one or more sets of rails include at least one set of rails running along the wharf alongside the cargo transferring means.

5. A wharf according to claim 3; wherein the one or more sets of rails include plural sets of rails running along the wharf alongside the cargo transferring means.

6. A wharf according to claim 3; wherein the cargo transferring means comprises a cargo crane movable along guideways running lengthwise along the wharf.

7. A wharf according to claim 2; wherein the cargo transferring means comprises a cargo crane movable along guideways running lengthwise along the wharf.

8. A wharf according to claim 1; wherein the cargo transferring means is operable to direclty transfer cargo from a vessel docked alongside the wharf to railcars on the one or more sets of rails without intermediate transfer of the cargo to other cargo-transport apparatus.

9. A wharf according to claim 8; wherein the one or more sets of rails run alongside or beneath the cargo transferring means.

10. A wharf according to claim 1; wherein the one or more sets of rails run alongside or beneath the cargo transferring means.

11. A pier extending into water at a port or harbor site, the pier comprising: a pair of opposed docking sides having a shape and length effective to enable marine vessels to dock alongside both docking sides of the pier; and cargo transferring means movable lengthwise along the pier for directly transferring cargo from a vessel docked along one docking side of the pier to a vessel docked along the other docking side of the pier.

12. A pier according to claim 11; wherein the cargo transferring means comprises a cargo crane movable lengthwise along the pier.

13. A pier according to claim 11; wherein the cargo transferring means comprises a cargo crane movable along guideways running lengthwise along the pier.

14. A pier according to claim 11; wherein the cargo transferring means is operable to directly transfer cargo from a vessel docked along one docking side of the pier to a vessel docked along the other docking side or the pier without intermediate transfer of the cargo to other cargo-transport apparatus.

15. A wharf extending into water at a port or harbor site, the wharf comprising: a docking side extending into the water and having a shape and length effective to enable marine vessels to dock alongside the wharf; one or more sets of rails running along the wharf for receiving thereon railcars; and a cargo crane movable along guideways running lengthwise along the wharf to directly transfer cargo from a vessel docked alongside the wharf to railcars on the one or more sets of rails, the cargo crane having hoisting apparatus for lifting and lowering the cargo.

16. A wharf according to claim 15; wherein the one or more sets of rails include at least one set of rails running along the wharf beneath the cargo crane.

17. A wharf according to claim 16; wherein the one or more sets of rails include at least one set of rails running along the wharf alongside the cargo crane.

18. A wharf according to claim 16; wherein the one or more sets of rails include plural sets of rails running along the wharf alongside the cargo crane.

19. A wharf according to claim 15; wherein the one or more sets of rails include plural sets of rails running along the wharf beneath the cargo crane.

20. A wharf according to claim 15; wherein the one or more sets of rails include at least one set of rails running along the wharf alongside the cargo crane.

21. A wharf according to claim 15; wherein the one or more sets of rails include plural sets of rails running along the wharf alongside the cargo crane.

22. A pier extending into water at a port or harbor site, the pier comprising: a pair of opposed docking sides having a shape and length effective to enable marine vessels to dock alongside both docking sides of the pier; and a cargo crane movable along guideways running lengthwise along the pier to directly transfer cargo from a vessel docked along one docking side of the pier to a vessel docked along the other docking side of the pier, the cargo crane having hoisting apparatus for lifting and lowering the cargo.

* * * * *